United States Patent
Chen et al.

(10) Patent No.: US 11,531,703 B2
(45) Date of Patent: Dec. 20, 2022

(54) DETERMINING DATA CATEGORIZATIONS BASED ON AN ONTOLOGY AND A MACHINE-LEARNING MODEL

(71) Applicant: Capital One Services, LLC, McLean, VA (US)

(72) Inventors: Kai-Wen Chen, Arlington, VA (US); Brian Donohue, Warrenton, VA (US); Xuemei Pan, Great Falls, VA (US); Nirmal Kumar Raajan, Irving, TX (US); Bethany Sehon, Oakton, VA (US); Naresh Singh, Frisco, TX (US); Xiaofei Wang, Bellevue, WA (US); Albert T. Zellers, McLean, VA (US); Weidan Zhou, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 181 days.

(21) Appl. No.: 16/913,722

(22) Filed: Jun. 26, 2020

(65) Prior Publication Data

US 2020/0410000 A1 Dec. 31, 2020

Related U.S. Application Data

(63) Continuation-in-part of application No. 16/654,661, filed on Oct. 16, 2019, now Pat. No. 11,263,262,
(Continued)

(51) Int. Cl.
*G06F 16/901* (2019.01)
*G06F 16/36* (2019.01)
*G06F 16/9038* (2019.01)

(52) U.S. Cl.
CPC .......... *G06F 16/901* (2019.01); *G06F 16/367* (2019.01); *G06F 16/9038* (2019.01)

(58) Field of Classification Search
CPC ... G06F 16/901; G06F 16/367; G06F 16/9038
(Continued)

(56) References Cited

U.S. PATENT DOCUMENTS 6,675,159 B1 1/2004 Lin et al.
6,810,405 B1 10/2004 LaRue et al.
(Continued)

FOREIGN PATENT DOCUMENTS

CN 102087669 B 1/2013
CN 104346130 A 2/2015
(Continued)

OTHER PUBLICATIONS

Alqahtani et al., "An Ontology-based Approach to Automate Tagging of Software Artifacts", 2017 ACM/IEEE International Symposium on Empirical Software Engineering and Measurement (ESEM), Nov. 9-10, 2017, pp. 169-174. (Year: 2017).*
(Continued)

*Primary Examiner* — Phuong Thao Cao
(74) *Attorney, Agent, or Firm* — Banner & Witcoff, Ltd.

(57) ABSTRACT

Aspects described herein may relate to methods, systems, and apparatuses that determine one or more categories associated with a dataset, or a portion thereof. The determination may be performed based on one or more tags associated with the dataset and/or a description associated with the dataset. Further, the determination may be performed by searching an ontology based on the one or more tags and/or the description. The determination may be performed by using a machine-learning model based on the one or more tags and/or the description. Once the one or more categories associated with the dataset are determined, the one or more categories may be used as a basis for modifying the dataset and/or validating the dataset.

20 Claims, 11 Drawing Sheets

Related U.S. Application Data which is a continuation of application No. 16/457,706, filed on Jun. 28, 2019, now Pat. No. 10,489,454.

(58) Field of Classification Search
USPC .................................................. 707/741
See application file for complete search history.

(56) References Cited

U.S. PATENT DOCUMENTS

| | | | |
|---|---|---|---|
| 7,093,200 | B2 | 8/2006 | Schreiber et al. |
| 7,493,253 | B1 | 2/2009 | Ceusters et al. |
| 7,953,693 | B2 * | 5/2011 | Smith .................... G06V 20/40 |
| | | | 706/52 |
| 8,140,535 | B2 * | 3/2012 | Eggebraaten ......... G06F 16/313 |
| | | | 707/706 |
| 8,275,765 | B2 | 9/2012 | Li et al. |
| 8,429,179 | B1 | 4/2013 | Mirhaji |
| 8,667,007 | B2 | 3/2014 | Tao |
| 8,782,051 | B2 | 7/2014 | Chashchin et al. |
| 9,135,348 | B2 | 9/2015 | Wu et al. |
| 9,684,683 | B2 | 6/2017 | Dang et al. |
| 10,261,990 | B2 | 4/2019 | Chowdhury et al. |
| 10,354,009 | B2 * | 7/2019 | Liang ....................... G06F 16/35 |
| 10,430,478 | B1 * | 10/2019 | Blalock ............... G06F 16/9566 |
| 10,846,573 | B2 * | 11/2020 | Skinner ............... G06F 21/6245 |
| 11,379,665 | B1 * | 7/2022 | Edmund ............... G06K 9/6256 |
| 2002/0188599 | A1 | 12/2002 | McGreevy |
| 2005/0289124 | A1 | 12/2005 | Kaiser et al. |
| 2007/0005621 | A1 | 1/2007 | Lesh et al. |
| 2007/0112714 | A1 | 5/2007 | Fairweather |
| 2007/0156669 | A1 | 7/2007 | Marchisio et al. |
| 2009/0055431 | A1 * | 2/2009 | Brodie .................. G06F 16/367 |
| 2009/0055732 | A1 | 2/2009 | Motaparti et al. |
| 2009/0112838 | A1 | 4/2009 | Eggebraaten et al. |
| 2010/0312779 | A1 | 12/2010 | Lim et al. |
| 2011/0087670 | A1 * | 4/2011 | Jorstad .................. G06F 40/284 |
| | | | 707/E17.011 |
| 2011/0196851 | A1 | 8/2011 | Vadlamani et al. |
| 2011/0225163 | A1 | 9/2011 | Lyon |
| 2011/0302163 | A1 | 12/2011 | Rhinelander et al. |
| 2012/0078955 | A1 | 3/2012 | Boguraev et al. |
| 2012/0296895 | A1 | 11/2012 | Robinson et al. |
| 2013/0067333 | A1 | 3/2013 | Brenneman |
| 2013/0091138 | A1 | 4/2013 | Liensberger et al. |
| 2013/0132365 | A1 | 5/2013 | Chang et al. |
| 2013/0212111 | A1 * | 8/2013 | Chashchin ............ G06F 40/284 |
| | | | 707/740 |
| 2013/0232134 | A1 | 9/2013 | Haugen et al. |
| 2013/0290317 | A1 | 10/2013 | Spivack et al. |
| 2014/0040275 | A1 * | 2/2014 | Dang ....................... G06F 40/30 |
| | | | 707/741 |
| 2014/0114949 | A1 * | 4/2014 | McClung ............... G06F 16/316 |
| | | | 707/711 |
| 2014/0181128 | A1 * | 6/2014 | Riskin .................. G06F 16/3344 |
| | | | 707/756 |
| 2014/0279622 | A1 | 9/2014 | Lamoureux et al. |
| 2014/0324808 | A1 | 10/2014 | Sandhu et al. |
| 2015/0026183 | A1 | 1/2015 | Tonkin |
| 2015/0142828 | A1 | 5/2015 | Nguyen et al. |
| 2015/0242387 | A1 | 8/2015 | Rachevsky et al. |
| 2015/0286718 | A1 | 10/2015 | Wang et al. |
| 2016/0004928 | A1 | 1/2016 | Blanchflower et al. |
| 2016/0162456 | A1 | 6/2016 | Munro et al. |
| 2016/0179775 | A1 | 6/2016 | Desai et al. |
| 2016/0179945 | A1 | 6/2016 | Lastra Diaz et al. |
| 2016/0364419 | A1 * | 12/2016 | Stanton .................... G06N 3/08 |
| 2017/0017644 | A1 * | 1/2017 | Accardo ............. G06F 16/2272 |
| 2017/0103072 | A1 | 4/2017 | Yuen et al. |
| 2017/0270188 | A1 | 9/2017 | Jain et al. |
| 2017/0286381 | A1 | 10/2017 | Fink et al. |
| 2017/0329842 | A1 | 11/2017 | Ng Tari et al. |
| 2018/0018960 | A1 | 1/2018 | Anantaram et al. |
| 2018/0046764 | A1 | 2/2018 | Katwala et al. |
| 2018/0330729 | A1 | 11/2018 | Golipour et al. |
| 2018/0365297 | A1 | 12/2018 | Bhardwaj et al. |
| 2019/0138806 | A1 | 5/2019 | Banerjee et al. |
| 2019/0258727 | A1 | 8/2019 | Schmotzer et al. |
| 2019/0272296 | A1 * | 9/2019 | Prakash ............. G06F 16/24534 |
| 2019/0340507 | A1 * | 11/2019 | Cervantes Martin .... G06N 3/08 |
| 2020/0034479 | A1 * | 1/2020 | Winzenried ........... G06F 16/334 |
| 2020/0342059 | A1 * | 10/2020 | Ziuzin ................... G06F 40/211 |
| 2020/0394190 | A1 * | 12/2020 | Chaudhuri ............ G06F 40/279 |
| 2021/0064692 | A1 * | 3/2021 | Srinivasan ............ G06F 40/134 |

FOREIGN PATENT DOCUMENTS

| | | | | | |
|---|---|---|---|---|---|
| CN | | 105069374 | A * | 11/2015 | ......... G06F 21/6245 |
| CN | | 107229743 | A * | 10/2017 | ......... G06F 16/2372 |
| JP | | 2007199885 | A * | 8/2007 | |
| WO | | 2011018245 | A1 | 2/2011 | |
| WO | WO-2013002436 | | A1 * | 1/2013 | ........... G06F 16/353 |

OTHER PUBLICATIONS

Lee, Sang-Young, "Method of Ontology-based Semantic Data Type Classification for Reuse", Advanced Science and Technology Letters, vol. 142 (SIT 2016), pp. 73-78. (Year: 2016).*

Sriharee, G., "An ontology-based approach to auto-tagging articles", Vietnam J Comput Sci (2015), vol. 2, No. 2, pp. 85-94 https://doi.org/10.1007/s40595-014-0033-6.

Lin H., Davis J., Zhou Y. (2009) An Integrated Approach to Extracting Ontological Structures from Folksonomies. In: Aroyo L. et al. (eds) The Semantic Web: Research and Applications. ESWC 2009. Lecture Notes in Computer Science, vol. 5554. Springer, Berlin, Heidelberg, pp. 654-668.

Pham M., Alse S., Knoblock C.A., Szekely P. (2016) Semantic Labeling: A Domain-Independent Approach. In: Groth P. et al. (eds) The Semantic Web—ISWC 2016. ISWC 2016. Lecture Notes in Computer Science, vol. 9981. Springer, Cham, 16 pages.

I. Katakis, G. Tsoumakas, I. Vlahavas, "Multilabel Text Classification for Automated Tag Suggestion", Proceedings of the ECML/PKDD 2008 Discovery Challenge, Antwerp, 2008. 9 pages.

Bada M., "Mapping of Biomedical Text to Concepts of Lexicons, Terminologies, and Ontologies", in: KumarV., Tipney (eds) Biomedical Literature Mining, Methods in Molecular Biology (Methods and Protocols), Humana Press, New York, NY, vol. 1159, 2014, pp. 33-45. (Year: 2014).

Corazza et al., "LINSEN: An Efficient Approach to Split Identifiers and Expand Abbreviations", in Proceedings of the 28th IEEE International Conference on Software Maintenance (ICSM), 2012, pp. 233-242. (Year: 2012).

Gao et al., "BIMTag: Concept-based Automatic Semantic Annotation of Online BIM Product Resources", Advanced Engineering Informatics, vol. 31, Jan. 2017, pp. 48-61. (Year: 2017).

Han et al., "Code Completion From Abbreviated Input", in Proceedings of the 2009 IEEE/ACM International Conference on Automated Software Engineering, 2009, pp. 332-343. (Year: 2009).

Han et al., "Code Completion of Multiple Keywords from Abbreviated Input", Automated Software Engineering, Sep. 2011, vol. 18, Issue 3/4, pp. 363-398. (Year: 2011).

Jaaniso E., "Automatic Mapping of Free Texts to Bioinformatics Ontology Terms", Master's Thesis (30 ECTS), University of Tartu, Institute of Computer Science, Computer Science Curriculum, 2016, 100 pages. (Year: 2016).

Shah et al., "Ontology-driven Indexing of Public Datasets for Translational Bioinformatics", BMC Bioinformatics, Feb. 2009, 10 ( Suppl 2):S1, 11 pages. (Year: 2009).

Sridhara et al., "Automatically Detecting and Describing High Level Actions Within Methods", in Proceedings of the 33rd International Conference on Software Engineering, Waikiki, Honolulu, HI, USA, May 21-28, 2011, pp. 101-110. (Year: 2011).

Stewart et al., "Comparing Metamap to MGrep as a Tool for Mapping Free Text to Formal Medical Lexicons", in Proceedings of the 1st International Workshop on Knowledge Extraction and Consolidation from Social-Media & the 11th International Semantic Web Conference (ISWC 2012), Nov. 12, 2012, pp. 63-77. (Year: 2012).

(56) References Cited

OTHER PUBLICATIONS

Delgoshaei, Parastoo, Mohammad Heidarinejad, and Mark A. Austin. "Combined ontology-driven and machine learning approach to monitoring of building energy consumption." In 2018 Building Performance Modeling Conference and SimBuild, Chicago, IL, pp. 667-674. 2018.

Doan, AnHai, Jayant Madhavan, Pedro Domingos, and Alon Halevy. "Ontology matching: A machine learning approach." In Handbook on ontologies, pp. 385-403. Springer, Berlin, Heidelberg, 2004.

Asim, Muhammad Nabeel, Muhammad Wasim, Muhammad Usman Ghani Khan, Waqar Mahmood, and Hafiza Mahnoor Abbasi. "A survey of ontology learning techniques and applications." Database 2018 (2018).

Asif, Muhammad, Hugo FMCM Martiniano, Astrid M. Vicente, and Francisco M. Couto. "Identifying disease genes using machine learning and gene functional similarities, assessed through Gene Ontology." PloS one 13, No. 12 (2018): e0208626.

Kastrati, Zenun, and Sule Yildirim Yayilgan. "Supervised Ontology-Based Document Classification Model." In Proceedings of the International Conference on Compute and Data Analysis, pp. 245-251. 2017.

Moser, Ben. "Introducing automatic data classification for Collibra Catalog." Blog posted Oct. 15, 2019. Webpage: Collibra. 9 pages. [Retreived Jun. 26, 2020 from https://www.collibra.com/blog/introducing-automatic-data-classification-for-collibra-catalog].

* cited by examiner

Example Determination of a Plurality of Potential Ontology Tags — 401

| Example Window Size 405 | Example of Sliding Window Over An Expanded Tokenized Tag 410 | | | Example of Potential Ontology Tag 415 |
|---|---|---|---|---|
| 1 | Column | One | Name | Column |
|  | Column | One | Name | One |
|  | Column | One | Name | Name |
| 2 | Column | One | Name | Column One |
|  | Column | One | Name | One Name |
| 3 | Column | One | Name | Column One Name |

| Key | Included Based On Current Window Position | Not Included Based On Current Window Position | ～ 403 |
|---|---|---|---|

FIG. 4

DETERMINING DATA CATEGORIZATIONS BASED ON AN ONTOLOGY AND A MACHINE-LEARNING MODEL

CROSS-REFERENCE TO RELATED APPLICATIONS

The present application is a continuation-in-part of co-pending U.S. application Ser. No. 16/654,661, filed Oct. 16, 2019, which is a continuation of U.S. application Ser. No. 16/457,706, filed Jun. 28, 2019. Each of the above-mentioned applications is hereby incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

There are numerous challenges to ensuring datasets, or portions thereof, are tagged, categorized, validated, and indexed such that the datasets can be easily found by a search and/or processed appropriately. For example, two dataset sources may generate tags for the two datasets using two different tagging conventions. Based on the two different tagging conventions, the two datasets may include similar types of data, but the tags may be different from each other. If the two datasets are indexed based on the different tags, a search for the two datasets may result in only one of, or neither of, the two datasets being found by the search. If the two datasets are categorized based on the different tags, the resulting categorization of the two datasets may be incorrect by associating the incorrect categories with one or more of the two datasets. If the two datasets are validated based on the different tags, the validation may be incorrect by the result being a false positive or a false negative. In view of these results, allowing similar datasets to be categorized, validated, and indexed based on the different tags may decrease the utility of searchable indexes, may lessen the reliability of searches, and may lessen the reliability of categorization and validation processes. Moreover, as the number of datasets and the number of dataset sources increase, searching for datasets may become increasingly unreliable. Indeed, as the number of datasets and the number of dataset sources increase, the potential for differences in the tags increases. An increase in the potential for differences in tags may cause search results, categorization results, and validation results to be less reliable.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein may address one or more inadequacies of dataset tagging, dataset categorization, dataset validation, dataset indexing, and dataset searching techniques. Further, aspects described herein may address one or more other problems, and may generally improve reliability and/or performance of systems that perform dataset tagging, dataset categorization, dataset validation, dataset indexing and/or dataset searching.

For example, aspects described herein may relate to the processing of one or more tags associated with a dataset and indexing the dataset based on the processing of the one or more tags. Processing a tag may include, for example, tokenizing the tag, mapping or expanding abbreviations included within the tag, and otherwise mapping or expanding elements of the tag based on alphanumeric characteristics. Additionally, as part of processing the tag, a number of potential tags may be determined. An ontology may be searched to determine whether any of the potential tags are also found within the ontology. The dataset may be indexed into a searchable index based on any of the potential tags that are found within the ontology.

Additional aspects described herein may relate to implementing the processing and indexing mentioned above in an enterprise computing environment. For example, the processing of the one or more tags may be initiated based on a request to register a dataset with a metadata repository associated with an enterprise. After the processing of the one or more tags associated with the dataset is complete and the dataset has been indexed with the metadata repository, a computing device associated with the enterprise may be able to initiate a search that finds the dataset. This may allow for an enterprise to implement a standardized tag policy for datasets.

Further aspects described herein may relate to determining one or more categories associated with a dataset or a portion thereof. The determination may be performed based on one or more tags associated with the dataset and/or a description associated with the dataset. An ontology may be searched based on the one or more tags and/or the description. The search of the ontology may result in the determination of one or more ontology-based categories. A machine-learning model may be used based on the one or more tags and/or the description. The use of the machine-learning model may result in the determination of one or more model-based categories. The one or more categories associated with the dataset may be selected from the one or more ontology-based categories and the one or more model-based categories. Once the one or more categories associated with the dataset are determined, the one or more categories may be used as a basis for modifying the dataset and/or validating the dataset.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIG. 4 depicts an example of determining one or more potential ontology tags in accordance with one or more aspects described herein.

DETAILED DESCRIPTION

Figure 1:
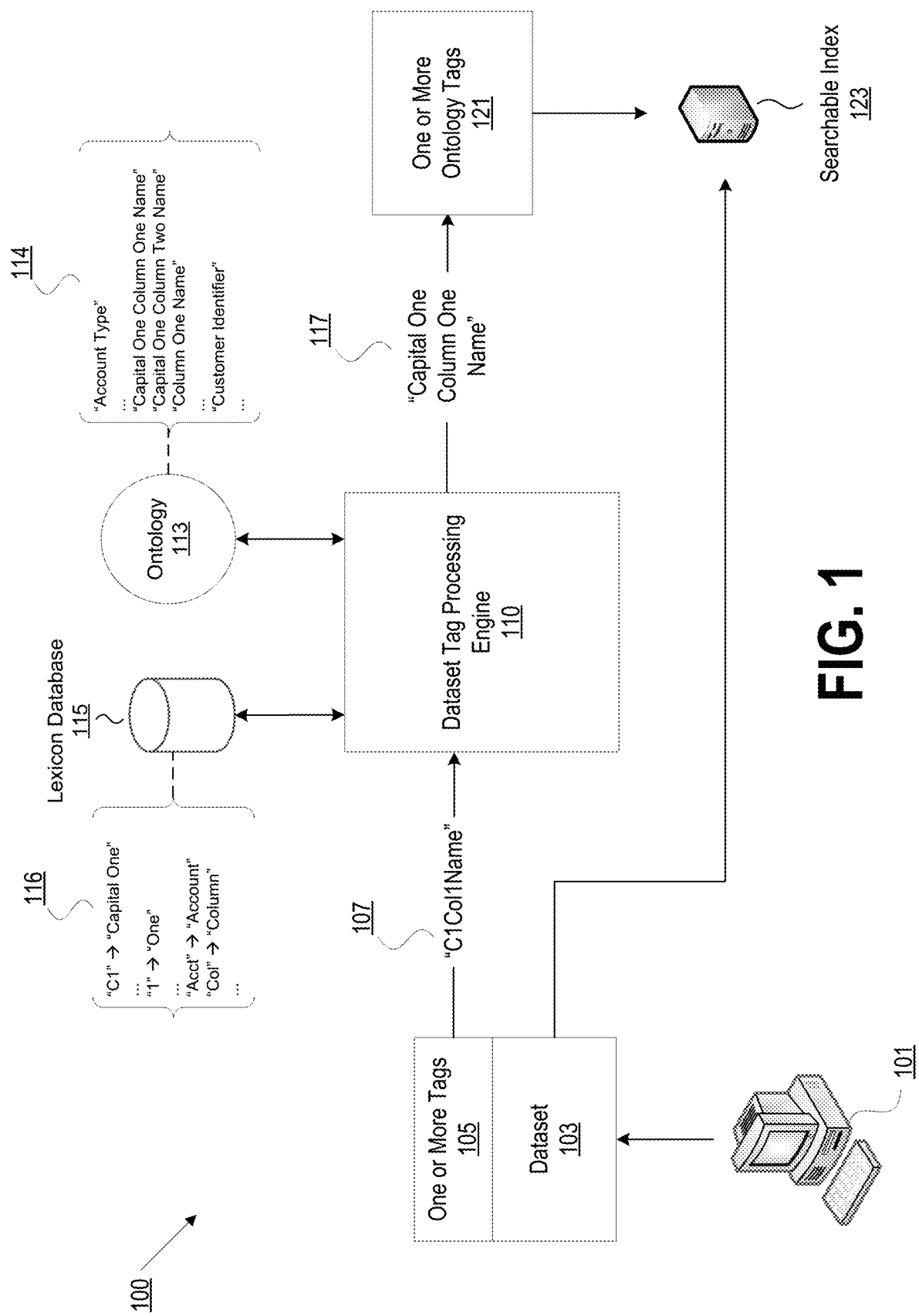
FIG. 1 depicts a block diagram of an example framework that, based on an ontology, indexes a dataset into a searchable index.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for indexing a dataset into a searchable database based on one or more tags and based on an ontology. Prior to indexing the dataset, any tag associated with the dataset may be processed based on an ontology. By processing a tag in accordance with aspects described herein, one or more tags that have been generated based on different tagging conventions may be converted into standardized tags as defined by the ontology. Throughout this disclosure, a tag will be referred to as including elements. An element of a tag may be any portion of a tag including, for example, an alphanumeric portion, a numeric portion, an alphabetic portion, and the like. A tag element may be interchangeably used with an element of a tag.

Based on methods and techniques described herein, one or more tags may be processed to, for example, tokenize the tag, map or expand abbreviations included within the tag, and otherwise map or expand elements of the tag based on alphanumeric characteristics. As part of processing the tag, a number of potential tags may be determined. An ontology may be searched to determine whether any of the potential tags are also found within the ontology. The ontology may include standardized tags. The standardized tags may be organized within the ontology via relationships that interrelate the standardized tags to each other. A potential tag may be compared to one or more of the standardized tags of the ontology. For example, the comparison may determine if the potential tag matches one of the standardized tags. Matching a potential tag to one of the standardized tags is only one example of how potential tags may be compared to the standardized tags. Additional examples as to how potential tags may be compared to the standardized tags will be apparent by the discussion of this disclosure. The dataset may be indexed into a searchable index based on any of the potential tags that are found within the ontology. After indexing in this manner, the dataset may be searched using the standardized tags. For example, if a search is performed for a first standardized tag, the search results would include any dataset indexed based on a tag that matches, or is otherwise found based on, the first standardized tag. In this way, dataset indexing and dataset searching may be improved by, for example, making the results of searches more reliable. Additional details and examples of these aspects, and others, will be discussed below in connection with FIGS. 1-5 and 11.

By way of further introduction, aspects described herein may relate to methods and techniques for determining one or more categories associated with a dataset. The one or more categories may be determined based on a search of an ontology and/or based on a machine-learning model. Throughout this disclosure, a category determined based on a search of an ontology may be referred to as an ontology-based category. A category determined based on a machine-learning model may be referred to as a model-based category. A machine-learning model may be interchangeably referred to as a model.

With respect to the methods and techniques for determining one or more categories associated with a dataset, the ontology may include associations between words and various categories. The words, for example, may include the standardized tags discussed above with respect to the methods and techniques for indexing the dataset. The associations between the words and the various categories may be based on relationships that interrelate the words and the various categories. In this way, for example, a word of the ontology may have one or more relationships with one or more categories and/or one or more relationships with one or more other words. A category of the ontology may have one or more relationships with one or more other categories and/or one or more relationships with one or more words. Based on these relationships, the ontology may be searched using search data that is based on a tag associated with a dataset and/or additional data associated with the dataset. As a result of the search, one or more ontology-based categories associated with the dataset may be determined. For example, the one or more ontology-based categories may be based on any category of the ontology identified during the search.

The machine-learning model may be configured to output categories based on tags and/or based on additional data. The machine-learning model may be used to determine one or more model-based categories associated with the dataset. The one or more model-based categories may be determined, for example, by sending, as input to the machine-learning model, a tag associated with the dataset and/or additional data associated with the dataset. Based on this input, the machine-learning model may generate, as output, the one or more model-based categories.

Throughout this disclosure, examples are described where a dataset may be modified and/or validated based on the one or more categories associated with the dataset. The dataset may be modified to indicate an ontology-based category and/or a model-based category. For example, if the dataset includes spreadsheet data formatted in rows and columns, an ontology-based category and/or a model-based category may be determined for a particular row of the dataset. A column may be appended to the dataset to indicate, for the particular row, the ontology-based category and/or the model-based category. The dataset may be validated based on an ontology-based category and/or a model-based category. For example, if the dataset includes pre-existing category data, the pre-existing category data may be validated based on a comparison to the ontology-based category or a comparison to the model-based category.

Methods and techniques for categorizing, modifying, and/or validating a dataset may be improved based on the use of the ontology-based categories and/or the model-based categories. For example, ontology-based categories and/or model-based categories may be used to improve the categorization and/or validation of confidential data. With respect to the categorization of confidential data, a dataset may be associated with a category that indicates the inclusion of confidential data. The dataset, therefore, may be subject to, or otherwise processed based on, one or more data confidentiality procedures. As an example of a data confidentiality procedure, access to the dataset, or a portion thereof, may be restricted to certain subsets of users. As another example of a data confidentiality procedure, the dataset, or a portion thereof, may be prevented from being disclosed to any user that does not have appropriate access rights for the category of confidential data. With respect to the validation of confidential data, a dataset having pre-existing category data may be validated to determine whether the pre-existing category data correctly indicates whether the dataset includes confidential data. Based on the validation, an indication of whether the pre-existing category data is validated may be sent to a user. If the indication indicates that the validation fails, the user may further review the dataset to determine the correct categorization. For example, the user may review the dataset to identify whether it includes confidential data and the user may modify the pre-existing categorization data to indicate whether the dataset includes confidential data. Additional details and examples of the aspects related to the categorization, modification, and validation of a dataset will be discussed below in connection with FIGS. 6-11.

FIG. 1 depicts a block diagram of an example framework that, based on an ontology, indexes a dataset into a searchable index. As a brief overview, the example framework 100 of FIG. 1 illustrates a process where a dataset 103 may be received from a dataset source, which is indicated by computing device 101. In some instances, the dataset 103 may be formatted in one or more columns or rows. Examples of datasets that may be formatted in one or more columns or rows includes tabular data and spreadsheet data. The dataset 103 may include various types of data including, for example, numeric data, textual data, image data, audio data, and the like. As one example, the dataset 103 may include particular types of data records such as, for example, customer record data, call log data, account information, chat log data, transaction data, and the like. The examples provided in connection with dataset 103 are only a few examples of the various formats, types of data, and types of data records for the dataset 103.

The dataset 103 may be associated with one or more tags 105. The one or more tags 105 may include one or more column names for the one or more columns, one or more row names for the one or more rows, data of a data field (e.g., data of a particular cell, as defined by a particular row and particular column), and/or one or more items of metadata associated with the dataset 103. The one or more tags 105 may have been input by a user associated with the dataset source and/or generated based on tagging conventions specified in a policy or profile. Each of the one or more tags 105 may include alphanumeric elements with various characteristics including, for example, snake case (e.g., "snake_case"), camel case (e.g., "CamelCase"), numeric characters (e.g., "123456789"), alphabetic characters (e.g., "abcdefABCDEF"), punctuation characters (e.g., ",."), symbolic characters (e.g., "!@#S%&*"), and any other type of characters (e.g., emojis, other Unicode character, and the like), formatting characteristics (e.g., new line character, tab character, space character), and the like.

The one or more tags 105 may be processed by a dataset tag processing engine 110. The dataset tag processing engine 110 may process the one or more tags 105 based on, among other things, an ontology 113, and a lexicon database 115. Based on the processing of the one or more tags 105, the dataset tag processing engine 110 may determine one or more ontology tags 121. The dataset 103 may be indexed into the searchable index 123 based on the one or more ontology tags 121. One or more computing devices may be configured as the searchable index 123.

Framework 100 provides an example of the processing and indexing performed by the dataset tag processing engine 110, the ontology 113, and the lexicon database 115. In particular, the framework 100 provides an example based on a tag of "C1Col1Name", which is depicted in FIG. 1 as example tag 107. Tag 107 may be for one of the columns of dataset 103 (e.g., a column name of tabular or spreadsheet data included within dataset 103).

The dataset tag processing engine 110 may determine, based on the processing of tag 107, one or more ontology tags 121. For example, as depicted in FIG. 1, the dataset tag processing engine 110 may determine, based on the processing of tag 107, an ontology tag 117 of "Capital One Column One Name". To determine the example ontology tag 117, the tag 107 may be processed based on the ontology 113 and the lexicon database 115. The lexicon database 115 may include mapping information that indicate conversions for various abbreviations and alphanumeric elements. As depicted in FIG. 1, lexicon database 115 includes mapping information 116. Mapping information 116 includes, among other mappings, a mapping for converting an alphanumeric abbreviation element of "C1" to "Capital One"; a mapping for converting the numeric element of "1" to "One"; a mapping for converting an abbreviated character element of "Acct" to "Account"; and a mapping for converting an abbreviated character elements of "Col" to "Column" Various other example mappings will be apparent based on the examples discussed throughout this disclosure. Indeed, mappings may be configured for any anticipated tagging convention.

The different mappings may be separately stored in the lexicon database 115. For example, the mappings for alphanumeric abbreviation elements may be stored separately from the mappings for abbreviated character elements. In this way, the dataset tag processing engine 110 may be able to apply the mappings in a specific order (e.g., by applying the mappings for alphanumeric abbreviation elements before applying the mappings for abbreviated character elements).

The ontology 113 may include standardized tags that are interrelated to each other by various relationships. As depicted in FIG. 1, ontology 113 includes standardized tags 114. For clarity, the relationships between the standardized tags 114 are not shown in FIG. 1. Standardized tags 114 include, among others, a first standardized tag "Account Type"; a second standardized tag "Capital One Column One Name"; a third standardized tag "Capital One Column Two Name"; a fourth standardized tag "Column One Name"; and a fifth standardized tag "Customer Identifier". Various other example standardized tags will be apparent based on the examples discussed throughout this disclosure. Indeed, any number of standardized tags may be defined based on the types of datasets that are to be stored and/or indexed. The standardized tags 114 and/or the relationships of the ontology 113 may change over time. For example, the ontology 113 may be updated such that a relationship is added or removed from the ontology 113. The ontology 113 may be updated such that a standardized tag may be added and/or removed from the standardized tags 114.

In addition to the ontology 113 and the lexicon database 115, the dataset tag processing engine 110 may process the tag 107 based on alphanumeric characteristics for splitting tag elements and based on tag extraction windows that are configured to slide over elements of a tag. In this way, the one or more ontology tags 121 may be determined based on the tag 107, based on the lexicon database 115, based on the ontology 113, based on alphanumeric characteristics for splitting tag elements, and based on tag extraction windows that are configured to slide over elements of a tag. This processing may be performed by the dataset tag processing engine 110. Table I illustrates an example of the processing of tag 107.

Table I illustrates example tag data that is used and/or processed by the dataset tag processing engine 110 in connection with processing the tag 107. In particular, Table I indicates examples of tag data that are determined by the dataset tag processing engine 110 (e.g., the column "Example Tag data"). The examples of tag data indicate both the starting point of the processing (e.g., tag 107), various intermediate results that are determined by the dataset tag processing engine 110 (e.g., the first through fourth intermediate results), and the resulting one or more ontology tags (e.g., one or more ontology tags 121). Table I further indicates how the dataset tag processing engine 110 may determine the example tag data including, for example, whether the example tag data is determined based on the lexicon database 115, the ontology 113, alphanumeric characteristics for splitting tag elements, or tag extraction windows that are configured to slide over elements. Additionally, the rows of Table I are organized in accordance with an example order in which the dataset tag processing engine 110 can process the tag 107 (e.g., the first intermediate result can be determined based on the tag 107, the second intermediate result can be determined based on the first intermediate result, one or more ontology tags 121 can be determined based on the intermediate result of the previous row, etc.). Examples of Table I will be discussed throughout this disclosure as a way to illustrate examples of example methods and techniques described herein.

TABLE I

Example processing of tag 107

| Type of Tag Data | Example Tag Data | Determined Based On |
|---|---|---|
| Tag 107 | "C1Col1Name" | Determined based on an association with the dataset 103 |
| First intermediate result | "Capital OneCol1Name" | Determined based on applying alphanumeric abbreviation mappings of the lexicon database 115 (e.g., the mapping "C1" → "Capital One") to the tag 107. |
| Second intermediate result | "Capital", "One", "Col", "1", "Name" | Determined based on alphanumeric characteristics for splitting the first intermediate result into tokenized elements (e.g., splitting based on camel case and a transition between alphabetic and numeric characters) |
| Third intermediate result | "Capital", "One", "Column", "One", "Name" | Determined based on applying the abbreviation mappings of the lexicon database 115 (e.g., the mapping "1" → "One"; and the mapping "Col" → "Column") to the second intermediate result |
| Fourth intermediate result | "Capital", "One", "Column", "One", "Name", "Capital One", "One Column", "Column One", "One Name", "Capital One Column", "One Column One", "Column One Name", "Capital One Column One", "One Column One Name", "Capital One Column One Name" | Determined based on sliding tag extraction windows (e.g., tag extraction windows of size one, size two, size three, size four, and size five) over the third intermediate result. |
| One or more Ontology Tags 121 | "Capital One Column One Name" | Determined based on searching the ontology 113 (e.g., comparing the fourth intermediate result to one or more of the standardized tags |

TABLE I-continued

Example processing of tag 107

| Type of Tag Data | Example Tag Data | Determined Based On |
|---|---|---|
| | | and determining that "Capital One Column One Name" matches one of the standardized tags 114, and determining that "Column One Name" matches one of the standardized tags 114) |

In view of the example of Table I, the dataset tag processing engine 110 may process the tag 107 in a series of steps in certain example embodiments. Further details on the steps will be discussed below in connection with FIGS. 4 and 5. Also in view of the example of Table I, in certain example embodiments the dataset tag processing engine 110 may maintain the order of tag 107 through its series of ordered steps. This is illustrated by the intermediate results of Table I. For example, tag 107 ("C1Col1Name") is depicted in FIG. 1 as being arranged in an order of the element "C1", then the element "Col", then the element "1", and then the element "Name". In the example of Table I, the intermediate results and the one or more ontology tags 121 maintain this order (e.g., the expanded element "Capital" comes prior to the expanded element of "One", etc.). In other words, in the example shown, the elements of tag 107 are not rearranged by the processing of the dataset tag processing engine 110 (e.g., the expanded element "Capital" is never directly adjacent to the expanded element of "Column" or the element "Name").

Figure 2:
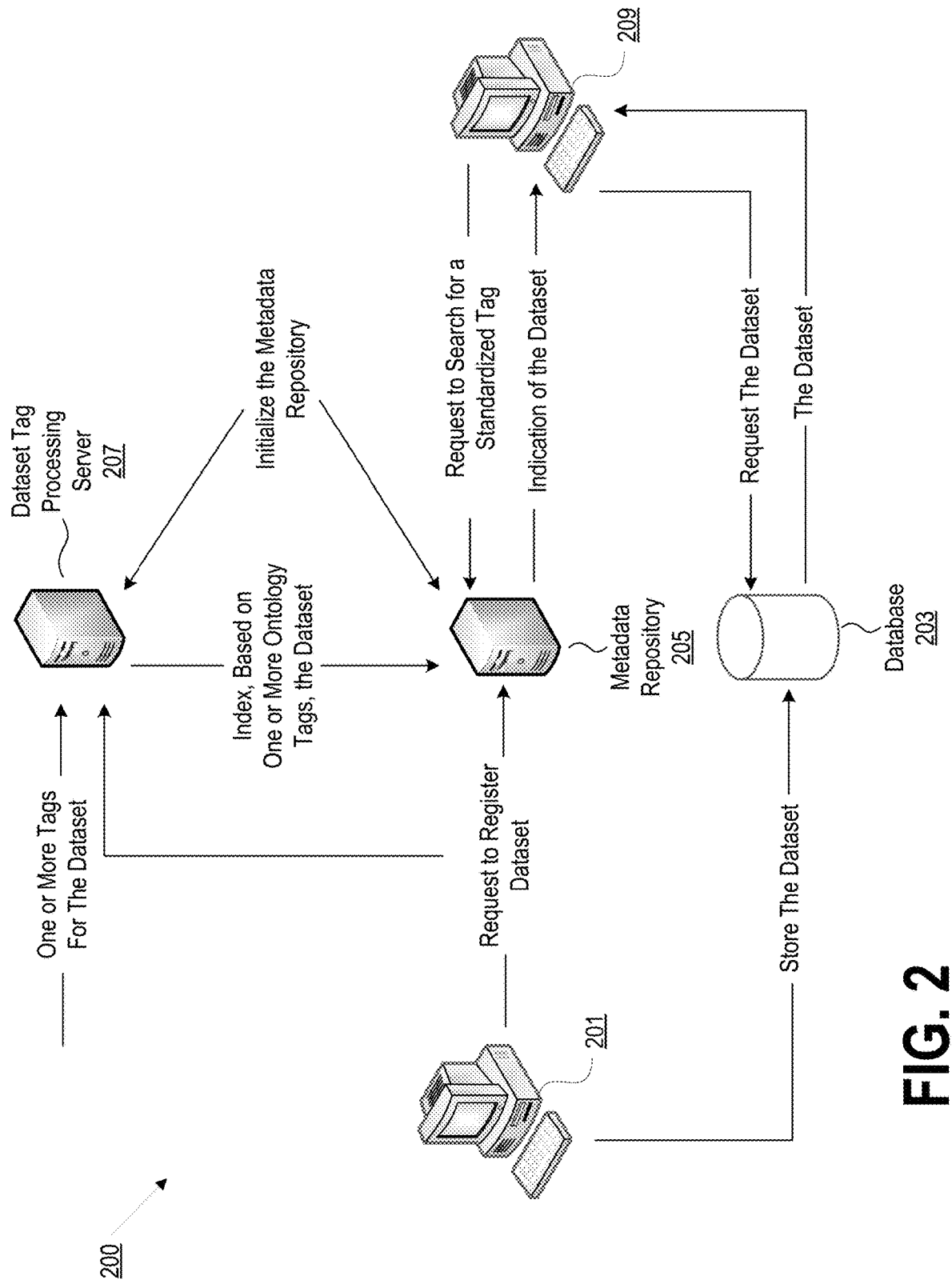
FIG. 2 depicts a block diagram of an enterprise computing environment that may be configured to index a dataset into a searchable index and perform a search for the dataset in accordance with one or more aspects described herein.

The example framework 100 of FIG. 1 could be used in a number of computing environments. One example computing environment is an enterprise computing environment that, among other things, stores and manages the datasets for an enterprise. The example framework 100 may be incorporated into an enterprise computing environment to index datasets and enable searches for the datasets. Further, the example framework 100 may be incorporated into an enterprise computing environment to allow for an enterprise to implement a standardized tag policy for datasets. FIG. 2 depicts a block diagram of an enterprise computing environment 200 that may be configured to index a dataset into a searchable index and perform a search for the dataset in accordance with one or more aspects described herein. The example enterprise computing environment 200 of FIG. 2 includes a dataset source, which is depicted as computing device 201; a database 203 configured to store datasets, which may be one of many databases for the enterprise; a metadata repository 205 configured to store metadata, and other information, that describes the datasets and/or the databases that store the datasets; a dataset tag processing server 207 that is configured to operate as the dataset tag processing engine 110 of FIG. 1; and a computing device 209, which may initiate a search of the datasets. At an arbitrary time, a dataset may be introduced to the enterprise computing environment 200. As depicted in FIG. 2, the dataset may be introduced based on the computing device 201 attempting to store the dataset in the database 203 and/or requesting to register the dataset with the metadata repository 205. The computing device 201 may be internal to the enterprise (e.g., a computing device being used by an employee of the enterprise and in communication with the database 203 and/or the metadata repository 205 via a VPN or a local intranet) or may be external to the enterprise (e.g., a computing device of a third-party entity that sends, via a public network, the dataset to the enterprise computing environment 200).

Based on the introduction of the dataset to the enterprise computing environment 200, the dataset tag processing server 207 may be configured to initiate processing of any tags associated with the dataset. Accordingly, as depicted in FIG. 2, the dataset tag processing server 207 may receive one or more tags (e.g., one or more tags 105 of FIG. 1) for the dataset (e.g., dataset 103 of FIG. 1). The one or more tags may be received via the computing device 201, received via the database 203, or extracted from the dataset itself.

As also depicted in FIG. 2, the dataset tag processing server 207 may be configured to initiate the processing based on the request to register the dataset. For example, the dataset tag processing server 207 may be configured to monitor for any requests to register being sent to the metadata repository and, if a request to register is identified, the dataset tag processing server 207 may begin processing the one or more tags. As another example, the metadata repository 205 may be configured with an initiation process that sends, to the dataset tag processing server 207, an indication of a request to register. The indication may cause the dataset tag processing server to begin processing the one or more tags. While the above two examples for initiating the processing of the one or more tags are in association with the metadata repository 205, similar monitoring and initiation processes may be configured in association with the database 203. Moreover, there are alternative ways in which the dataset tag processing server 207 may initiate the processing of the one or more tags. For example, the computing device 201 may send the dataset to the dataset tag processing server 207 and, based on receipt of the dataset, the dataset tag processing server 207 may initiate the processing of the one or more tags.

After initiating the processing of the one or more tags, the dataset tag processing server 207 may perform the processing of the one or more tags. This may be performed similar to the discussion of the dataset tag processing engine 110 of FIG. 1. In particular, the dataset tag processing server 207 may process the one or more tags based on a lexicon database (e.g., lexicon database 115), an ontology (e.g., the ontology 113), alphanumeric characteristics for splitting elements of a tag into tokens, and/or tag extraction windows that are configured to slide over elements of a tag. The dataset tag processing server 207 may be configured to store the ontology and/or the lexicon database, or the dataset tag processing server 207 may have access to the ontology and/or the lexicon database.

Based on processing the one or more tags, the dataset tag processing server 207 may determine one or more ontology tags (e.g., one or more ontology tags 121 of FIG. 1) for the dataset. Based on the one or more ontology tags, the dataset tag processing server 207 may be configured to cause the dataset to be indexed based on the one or more ontology tags. As depicted in FIG. 2, metadata repository 205 is configured as a searchable index (e.g., searchable index 123 of FIG. 1). Accordingly, the dataset tag processing server 207 may communicate with the metadata repository 205 to index the dataset based on the one or more ontology tags. By indexing in this manner, the enterprise may be able to index datasets based on standardized tags (e.g., standardized tags 114 of FIG. 1) that are defined by the ontology. Indexing the dataset may include, for example, storing an association between the dataset and the one or more ontology tags so that if a search is performed based on an ontology tag, an indication of the dataset can be included in the results of the search. The indication of the dataset may indicate a storage location of the dataset (e.g., the indication of the dataset may include a resource link, or other identifier, to a location where the dataset is stored on the database 203). Accordingly, the association may include the storage location of the data set.

After the dataset has been indexed based on the one or more ontology tags, users or other devices associated with the enterprise computing environment 200, based on a search, may be able to locate and/or access the dataset. For example, computing device 209 may be configured to initiate a search of the metadata repository 205. As depicted in FIG. 2, the computing device 209 may be configured to initiate a search by sending a request to search for a particular standardized dataset tag. The particular standardized dataset tag may be one of the standardized tags (standardized tags 114 of FIG. 1) defined by the ontology. The particular standardized dataset tag may be used by a search to find an ontology tag that formed the basis for indexing the dataset. For example, the searching may determine that the particular standardized dataset tag matches the ontology tag that formed the basis for indexing the dataset. Accordingly, when performing the search, the metadata repository 205 may be configured to determine, based on the particular standardized dataset tag and the searchable index of the metadata repository 205, at least one of the ontology tags (e.g., ontology tags 121 of FIG. 1), and include an indication of the dataset as part of the search results. As depicted in FIG. 2, the metadata repository 205, based on performing the search, may be configured to send, to the computing device 209, an indication of the dataset as part of the search results. The indication may include the storage location of the dataset. Upon receiving the indication of the dataset, the computing device 209 may be configured to display the indication of the dataset. A user may select the indication and, based on the selection, the computing device 209 may be configured to send, to the database 203, a request for the dataset. Based on the request, the database 203 may be configured to send, to the computing device 209, the dataset. Upon receipt of the dataset, the computing device 209 may be configured to display the dataset. The requesting and/or displaying of the dataset are examples of the actions that can be performed based on a search. Other actions may be performed. For example, the results of the search may be subject to one or more actions associated with the particular standardized tag (e.g., encrypting any dataset found by the search; generating a report indicating any dataset, and dataset sources, found by the search). The actions may be automatically by a computing device upon receiving the results of the search.

As also depicted in FIG. 2, the metadata repository 205 may be initialized. For example, the metadata repository 205 may include a pre-existing index of searchable tags. Each of the searchable tags may be processed by the dataset tag processing server 207 to determine, for each tag, one or more initialized ontology tags. Each tag may be replaced in the pre-existing index by the one or more initialized ontology tags. In this way, the pre-existing index may be converted to be searched based on the standardized tags of the ontology. Because the standardized tags and/or the relationships of the ontology may change over time (e.g., a relationship and/or a standardized tag may be added and/or removed from the ontology), this initialization process may be performed on a periodic schedule, on-demand schedule, or based on an update to the ontology, to update the metadata repository based on the ontology.

Figure 3:
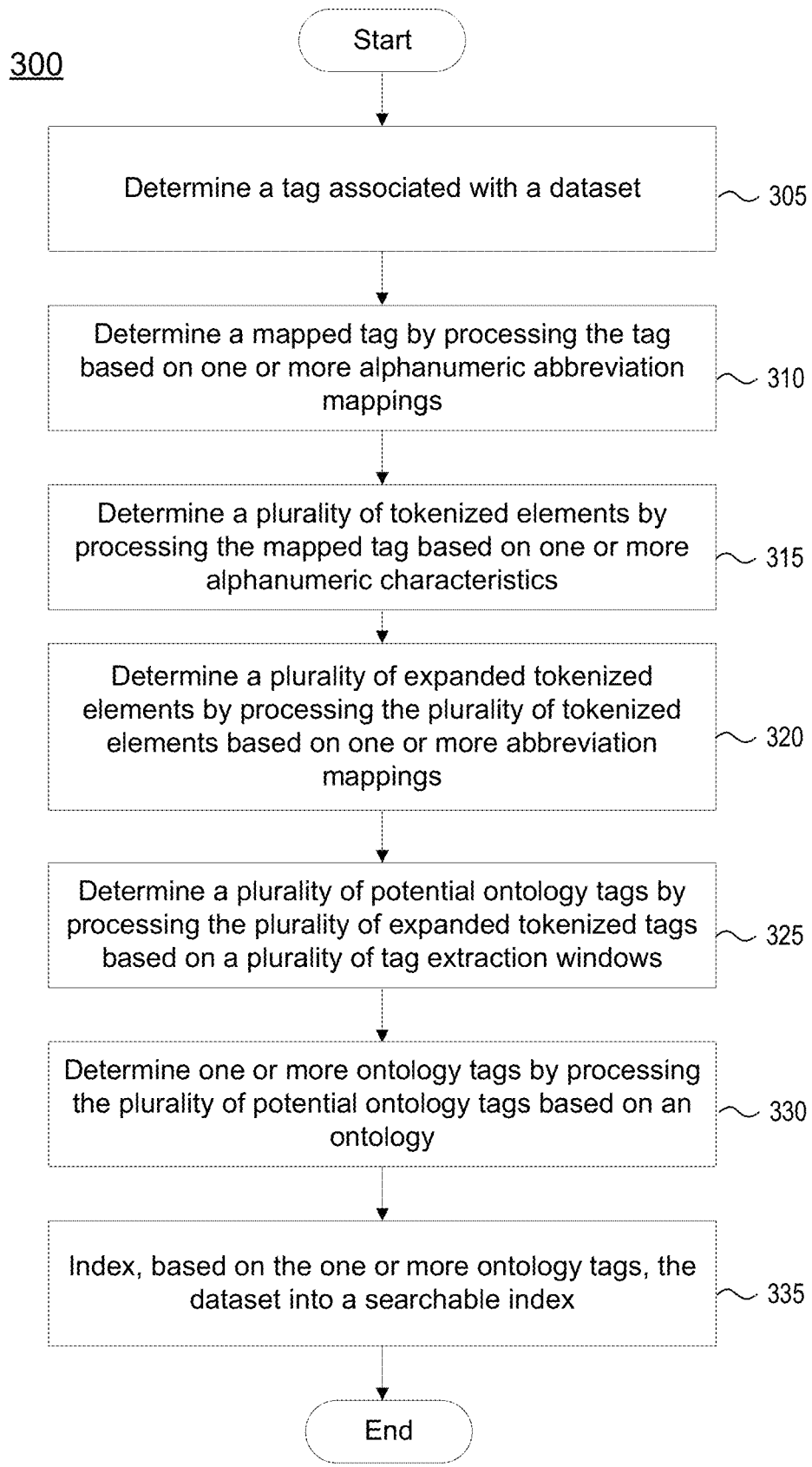
FIG. 3 depicts an example method that may, based on an ontology, index a dataset into a searchable index.
Figure 5:
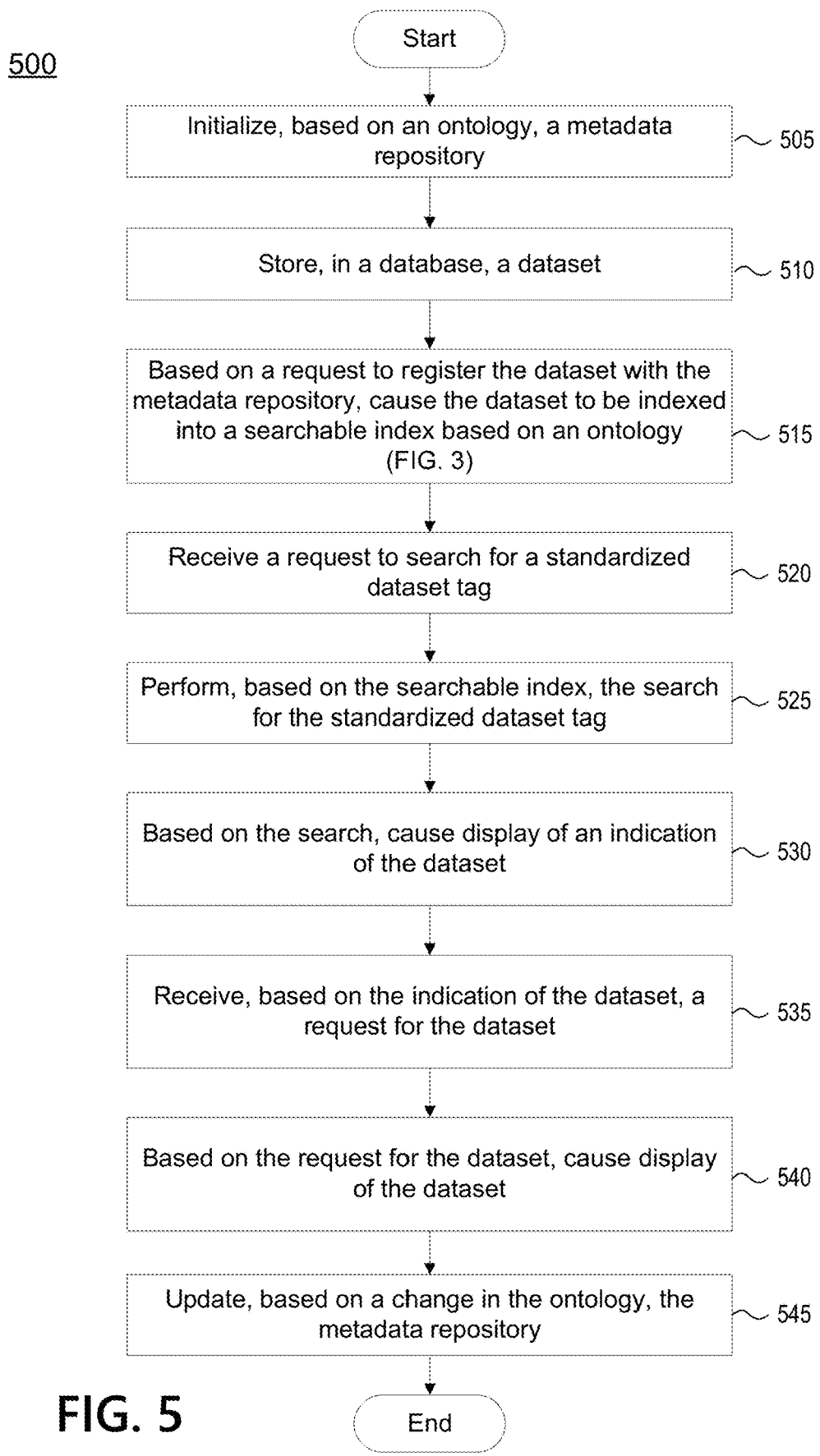
FIG. 5 depicts an example method that may index a dataset into a searchable index and perform a search for the dataset in accordance with one or more aspects described herein.

Having discussed the example framework 100 of FIG. 1 and the example enterprise computing environment 200 of FIG. 2, example methods that may be performed by one or more computing devices based on the example framework 100 and/or as part of the example enterprise computing environment 200 will be discussed. The example methods are depicted at FIGS. 3 and 5. FIG. 4 provides an illustrative example for one of the steps discussed in connection with FIG. 3.

FIG. 3 depicts an example method 300 that may, based on an ontology, index a dataset into a searchable index. Method 300 may be implemented by one or more suitable computing devices, as described herein. For example, method 300 may be implemented by a computing device (e.g., dataset tag processing server 207; and/or any one of computing devices 601, 605, 607, and 609 of FIG. 6), and/or combination of computing devices (e.g., a combination of dataset tag processing server 207 and any other device of the enterprise computing environment 200; and/or a combination of computing devices 601, 605, 607, and 609 of FIG. 6). Method 300 may be implemented in suitable computer-executable instructions, such as in dataset processing software 627. Method 300 may also include access of an ontology and/or a lexicon database, such as ontology 113 and lexicon database 115 of FIG. 1. The ontology and lexicon database may be stored as lexicon and ontology data 629 of FIG. 6 or as part of some other database.

At step 305, the one or more computing devices may determine a tag associated with a dataset. This determination may be based on the one or more computing devices receiving the dataset, receiving one or more tags for the dataset, receiving an indication to initiate processing of one or more tags for the dataset, or receiving some other indication that the tag is associated with the dataset. This determination may include retrieving the tag from a dataset source that stores the dataset and/or extracting the tag from the dataset itself.

After determining the tag, the one or more computing devices may proceed to process the tag. Steps 310-330 represent an ordered series of steps that is performed as part of the processing of the tag. The processing performed by steps 310-330 is similar to the examples discussed in connection with the dataset tag processing engine 110 of FIG. 1 and Table I. Additionally, and similar to the examples discussed in connection with FIG. 1 and Table I, the one or more computing devices may, as part of the processing of the tag, maintain the order of the tag's elements.

At step 310, the one or more computing devices may determine a mapped tag by processing the tag based on one or more alphanumeric abbreviation mappings. The one or more alphanumeric abbreviation mappings may include one or more mappings for abbreviations that include alphabetic and numeric characters (e.g., the mapping "C1"→"Capital One" as included in mapping information 116 of FIG. 1). This determination may result in a mapped tag that, as compared to the tag, includes an expansion of one or more alphanumeric elements of the tag. For example, if the tag includes "C1Col1Name" (e.g., tag 107 of FIG. 1), this determination may result in a mapped tag equivalent to the first intermediate result of Table I. With respect to the example of Table I, the element "C1" of the tag has been expanded to the element "Capital One", which results in a mapped tag that includes "Capital OneCol1Name".

At step 315, the one or more computing devices may determine a plurality of tokenized elements by processing the mapped tag based on one or more alphanumeric characteristics. The one or more alphanumeric characteristics may be for splitting tag elements. Examples of alphanumeric characteristics that may be for splitting tag elements include snake case (e.g., "snake_case"), camel case (e.g., "Camel-Case"), a transition between alphabetic and numeric characters (e.g., "B1" or "1C"), a punctuation character (e.g., a period character, a comma character), a symbolic character (e.g., any one of "!@#S%&*"), and a formatting characteristic (e.g., new line character, tab character, space character). This determination may result in a plurality of tokenized elements that, as compared to the mapped tag, separate the elements of the mapped tag from each other if one of the alphanumeric characteristics occurs in the mapped tag. For example, continuing with the example of step 310, this determination may result in a plurality of tokenized elements equivalent to the second intermediate result of Table I (e.g., a plurality of tokenized elements that includes "Capital", "One", "Col", "1", and "Name"). With respect to the example of Table I, the mapped tag that includes "Capital OneCol1Name" has been split based on occurrences of camel case and transitions between alphabetic and numeric characters.

At step 320, the one or more computing devices may determine a plurality of expanded tokenized elements by processing the plurality of tokenized elements based on one or more abbreviation mappings. The one or more abbreviation mappings may include one or more mappings for abbreviations that include alphabetic or numeric characters (e.g., the mapping of "Col"→"Column" and the mapping "1"→"One", as included in mapping information 116 of FIG. 1). This determination may result in plurality of expanded tokenized elements that, as compared to the plurality of tokenized elements, includes an expansion of one or more abbreviated elements of the plurality of tokenized elements. For example, continuing the example of step 315, this determination may result in a plurality of expanded tokenized elements equivalent to the third intermediate result of Table I (e.g., a plurality of expanded tokenized elements that includes "Capital", "One", "Column", "One", and "Name"). With respect to the example of Table I, the element "Col" of the plurality of expanded tokenized elements has been expanded to the element "Column", and the element "1" of the plurality of expanded tokenized elements has been expanded to the element "One".

At step 325, the one or more computing devices may determine a plurality of potential ontology tags by processing the plurality of expanded tokenized elements based on a plurality of tag extraction windows. This determination may be performed based on sliding a plurality of tag extraction windows over the plurality of expanded tokenized elements. Each of the plurality of tag extraction windows may have a window size that is different from each other tag extraction window. For example, the window size may be in units of elements (e.g., a window size of 1 would include a single tokenized element), and the tag extraction windows may include windows of sizes 1 up to the number of elements in the plurality of expanded tokenized elements. Continuing the example of step 320, the tag extraction windows may include windows of size 1, 2, 3, 4, and 5, based on the plurality of expanded tokenized elements including five elements (e.g., elements "Capital", "One", "Column", "One", and "Name"). This determination may result, for example, in a plurality of potential ontology tags that includes the fourth intermediate result of Table I, plus additional potential ontology tags for the tag extraction windows of size 1, 3, and 5.

FIG. 4 provides an additional example 401 of determining a plurality of potential ontology tags. In particular, as depicted at column 410 of FIG. 4, three different tag extraction windows are slid across tokenized elements of "Column", "One", and "Name". The current position of the tag extraction window is shown by an element having a black background with white text. As depicted at column 405 of FIG. 4, the three different tag extraction windows have sizes of 1, 2, and 3. As depicted at column 415 of FIG. 4, the sliding of the three different tag extraction windows results in six different potential ontology tags. Only elements included based on the window's current position are included as a potential ontology tag. Sliding the first tag extraction window of size 1 results in potential ontology tags of "Column", "One", and "Name". Sliding the second tag extraction window of size 2 results in potential ontology tags of "Column One" and "Name One". Sliding the third tag extraction window tag of size 3 results in a potential ontology tag of "Column One Name". Further, as illustrated, by sliding the window in this manner, the potential ontology tags maintain the order of the elements. In other words, the elements are not rearranged by the sliding of the tag extraction windows (e.g., the element "Column" is never directly adjacent to the element of "Name" in a potential ontology tag).

Continuing at step 330 of FIG. 3, the one or more computing devices may determine one or more ontology tags by processing the plurality of potential ontology tags based on an ontology. As discussed above, the ontology may include standardized tags (e.g., standardized tags 114 of FIG. 1) and relationships that interrelate the standardized tags to each other. Processing the plurality of potential ontology tags based on the ontology may be performed by searching the ontology and comparing the plurality of potential ontology tags to the standardized tags of the ontology. Based on the comparison, the one or more ontology tags may be determined. For example, the comparison may be used to determine any matches to the plurality of potential ontology tags. If a match is determined, the matching tag is included in the one or more ontology tags. In this way, only potential ontology tags that match a standardized tag may be included as one of the ontology tags. Continuing the example of step 325, the plurality of potential ontology tags may include a potential ontology tag of "Capital One Column One Name", and the one or more ontology tags would include a tag of "Capital One Column One Name" based on a search of ontology 113 (e.g., the comparison is used to determine that the potential ontology tag matches one of the standardized tags 114).

Matches between the plurality of potential ontology tags and the standardized tags may be a complete match. For example, a match may be determined if a potential ontology tag exactly matches a standardized tag (e.g., a potential tag of "Capital One" would match a standardized tag of "Capital One", and would not match a standardized tag of "Column One"). The matches between the plurality of potential ontology tags and the standardized tags may be based on a threshold match. The threshold match may be based on comparing the elements of the potential ontology tag and the elements of the standardized tag. For example, a match may be determined if there are a number of matching elements that is above a threshold (e.g., a potential tag of "Capital One" would result in a 50% match of a standardized tag of "Column One", and "Column One" would be included in the one or more ontology tags if the 50% match is greater than the threshold).

The matching may be performed based on a filtering process. For example, the standardized tags may be filtered based on the size of a potential ontology tag or an element of the potential ontology tag. For example, for filtering based on the size of a potential ontology tag, the potential ontology tag may be compared to standardized tags that have an equal size (e.g., a potential ontology tag "Column One Name" has a size of three and, based on filtering by size, the potential ontology tag will be compared to standardized tags that also have a size of three). As another example, for filtering based on an element of a potential ontology tag, the potential ontology tag may be compared to standardized tags that have a matching first element (e.g., a potential ontology tag "Column One Name", based on filtering by element, will be compared to standardized tags that also begin with the element "Column").

Further, the one or more ontology tags may be determined based on one or more relationships of the ontology. For example, a first standardized tag may be found within the ontology based on a comparison of the first standardized tag and a potential ontology tag. The ontology may include a relationship that interrelates the first standardized tag to a second standardized tag. Based on the relationship, the second standardized tag may be included in the one or more ontology tags. As one particular example, the first standardized tag may for financial records of the enterprise. The second standardized tag may indicate a category for the first standardized tag (e.g., the second standardized tag may for private, confidential, or sensitive pieces of data). Based on the second standardized tag and based on the relationship, the ontology indicates that financial records of the enterprise are private, confidential, or sensitive pieces of data. By including the second standardized tag in the one or more ontology tags, the dataset may be indexed based on the category and searches for particular categories may be performed. For example, the enterprise may have established additional processes that apply data security protocols to any data indexed based on the second standardized tag.

Additionally, fuzzy matching techniques may be used when determining the one or more ontology tags. A potential ontology tag may be included in the one or more ontology tags is the fuzzy matching technique determines a match. By using fuzzy matching, the determination of the one or more ontology tags may be more resilient to typos, or other errors, in the tag that are not anticipated by the lexicon database.

At step 335, the one or more computing devices may index, based on the one or more ontology tags, the dataset into a searchable index. Indexing may include, for example, storing an association between the dataset and the one or more ontology tags. Based on the association and if a search is performed based on an ontology tag, an indication of the dataset can be included in the results of the search. The indication of the dataset may indicate a storage location of the dataset (e.g., the indication of the dataset may include a resource link, or other identifier, to a location where the dataset is stored on the database 203). Accordingly, the association may include the storage location of the data set. Continuing the example of step 330, indexing the dataset may include storing an association between the dataset and the ontology tag of "Capital One Column One Name". In this way, if a search is performed for the tag "Capital One Column One Name", an indication of the dataset may be included in the results.

The above discussion of FIG. 3 provides one example of the methods that may be performed to index a dataset based on a dataset tag and an ontology. Variations on the example method include changing the order of the steps of method 300, removing one or more of the steps of method 300, and adding one or more steps to the method 300. As one example, step 310 may be removed. Instead of performing step 310, the method may proceed from step 305 to step 315, and the plurality of tokenized elements may be determined based on the tag instead of the mapped tag.

Steps 325-330 of FIG. 3 and the example of FIG. 4 provide an example of how ontology tags may be determined based on an ontology. Other processes may be used to determine the ontology tags. For example, instead of tag extraction windows and searching the ontology, the expanded tokenized tags may be searched. As one example, each of the standardized tags of the ontology may be used as a basis for searching the expanded tokenized tags. This search may be performed by sliding a current standardized tag over the expanded tokenized tags. Sliding the current standardized tag may be performed similarly to the sliding of the tag extraction windows of FIG. 4. However, instead of extracting potential tags based on a current position of a tag extraction window, the current position of the current standardized tag may be used as a basis for comparing the current standardized tag to a portion of the expanded tokenized tags. Based on the comparison, if a match to the current standardized tag is found, the current standardized tag may be included in the one or more ontology tags. If a match is not found, the current standardized tag may continue to slide to a next position. If the end of the expanded tokenized tag is reached, the next standardized tag may be slid over the expanded tokenized tag. Moreover, this alternative example of determining ontology tags may be combined with steps 325-330 of FIG. 3. For example, if the expanded tokenized tags have a number of elements greater than and, optionally, equal to a threshold (e.g., greater than 50 elements), then this alternative example of determining ontology tags may be performed. If the expanded tokenized tags have a number of elements less than and, optionally, equal to the threshold (e.g., less or equal to 50 elements), then steps 325 and 330 may be performed.

Additionally, steps of 310-330, which represent the ordered steps performed by the one or more computing devices to process the tag, may be ordered based on one or more tagging conventions. One tagging convention discussed throughout this disclosure is the usage of the abbreviation "C1" for "Capital One". Continuing the examples discussed in connection with steps 310-330, step 310 may be performed prior to step 315 so that certain alphanumeric abbreviations, including the abbreviation "C1", are expanded prior to the determination of the tokenized elements. If the order was reversed, the resulting plurality of potential ontology tags may be different from the example discussed in connection with step 325. For example, with respect to the abbreviation "C1", if steps 310 and 315 were reversed, the abbreviation "C1" would be split into two elements prior to the expansion to "Capital One". If a mapping of "C" →"Capital" does not exist, the processing performed by the reverse order of steps 310 and 315 would not expand the "C" into "Capital", and the resulting potential ontology tags would not include any instance of "Capital".

FIG. 5 depicts an example method 500 that may index a dataset into a searchable index and perform a search for the dataset. Method 500 may be implemented by one or more suitable computing devices, as described herein. As an example, method 500 may be implemented by one or more computing devices of an enterprise computing environment, such as the example enterprise computing environment 200 of FIG. 2. Method 500 may also include performance of a method that is the same as or similar to the method 300 of FIG. 3. Accordingly, the one or more computing devices that implement method 500 may be any of the one or more computing devices that implement method 300.

At step 505, the one or more computing devices may initialize, based on an ontology, a metadata repository. Initializing the metadata repository may include, for example, processing or replacing, based on the ontology, any tag stored in a searchable index of the metadata repository. Once initialization is complete, the metadata repository may include a searchable index based on the standardized tags of the ontology. The initializing may be performed similar to the processing of FIG. 3. For example, each tag stored in the searchable index may be processed by performing steps 310-330 of FIG. 3, and upon completing the processing of each tag, each tag may be replaced with the results of the processing (e.g., the one or more ontology tags determined based on each tag at step 330 of FIG. 3). In this way, the metadata repository may be initialized by converting the searchable index to be searched based on the standardized tags of the ontology.

At step 510, the one or more computing devices may store, in a database, a dataset. The database (e.g., database 203 of FIG. 2) may be one of many databases for the enterprise. Further, the dataset may be stored in a database that is configured to store the type of data included by the dataset. For example, if the dataset includes call record data, the dataset may be stored in a database that is configured to store call records for the enterprise. If the dataset includes account information, the dataset may be stored in a database that is configured to store account information.

At step 515, the one or more computing devices may, based on a request to register the dataset with the metadata repository, cause the dataset to be indexed into a searchable index based on an ontology. The request to register the dataset may be sent by a dataset source (e.g., computing device 201 of FIG. 2) and a monitoring process or an initiation process (e.g., as discussed above in connection with the dataset tag processing server 207 and the metadata repository 205) may, based on the request, cause the dataset to be indexed into a searchable index based on an ontology. Causing the dataset to be indexed into a searchable index based on the ontology may cause the one or more computing devices to process one or more tags associated with the dataset. Accordingly, method 300 of FIG. 3 may be performed for each of the one or more tags associated with the dataset. As discussed in connection with FIG. 3, the processing of a tag may be performed by, among other things, determining one or more ontology tags (e.g., one or more ontology tags 121 of FIG. 1) for the dataset and indexing the dataset based on the one or more ontology tags. In some instances, the searchable index may be configured as part of the metadata repository.

At step 520, the one or more computing devices may receive a request to search for a standardized dataset tag. For example, a computing device (e.g., computing device 209 of FIG. 2) associated with the enterprise may initiate a search by sending a request that identifies a particular standardized tag of the ontology (e.g., "Capital One Column One Name").

At step 525, the one or more computing devices may perform, based on the searchable index, a search may be performed for the standardized dataset tag. The search may look for any datasets indexed based on an ontology tag that matches, or may otherwise be found based on, the particular standardized tag. Continuing the example of step 515, the results of the search may include an indication of any dataset indexed based on an ontology tag that matches, or is otherwise found based on, "Capital One Column One Name".

At step 530, the one or more computing devices may, based on the search, cause display of an indication of the dataset. This may include sending the indication of the dataset to the computing device that requested the search (e.g., computing device 209 of FIG. 2). Upon receipt of the indication, the computing device may display the indication of the dataset. The indication of the dataset may include a storage location of the dataset.

At step 535, the one or more computing devices may receive, based on the indication of the dataset, a request for the dataset. For example, a user may, based on the display caused in connection with step 525, select the dataset and, based on the selection, the request for the data set may be sent to a database that stores the dataset (e.g., database 203 of FIG. 2).

At step 540, the one or more computing devices may, based on the request for the dataset, cause display of the dataset. This may include sending the dataset to the computing device that requested the dataset (e.g., computing device 209 of FIG. 2). Upon receipt of the dataset, the computing device may display the indication of the dataset (e.g., display the dataset in a tabular or spreadsheet format).

In addition to requesting and/or displaying the dataset, additional or alternative actions may be performed. For example, the standardized tag that formed the basis for the search performed at step 525 may be for a particular category of data (e.g., the standardized tag may be for private, confidential, or sensitive pieces of data). The results of the search may be subject to one or more additional computing actions associated with the particular category (e.g., applying data security protocols to the resulting datasets such as data encryption protocols; generating a report indicating the resulting datasets and/or the dataset sources of the resulting datasets).

At step 545, the one or more computing devices may update, based on a change in the ontology, the metadata repository. The standardized tags and/or the relationships of the ontology may change over time (e.g., a relationship and/or a standardized tag may be added and/or removed from the ontology). Accordingly, based on a periodic schedule, an on-demand schedule, or a determination that an update to the ontology occurred, the metadata repository may be updated based on the ontology. The update may be performed similar to the processing of FIG. 3. For example, each tag stored in the searchable index may be processed by performing steps 310-330 of FIG. 3, and upon completing the processing of each tag, each tag may be replaced with the results of the processing (e.g., the one or more ontology tags determined based on each tag at step 330 of FIG. 3). In this way, the metadata repository may be updated based on a change in the ontology.

As discussed above, aspects described herein may relate to the categorization, modification, and/or validation of a dataset. The categorization may be performed based on a search of a ontology and/or based on a machine-learning model. Examples of these aspects, and others, will be discussed below in connection with FIGS. 6-11. Further, various aspects related to the categorization, modification and/or validation of a dataset may be combined with one or more aspects described above in connection with FIGS. 1-5.

Figure 6:
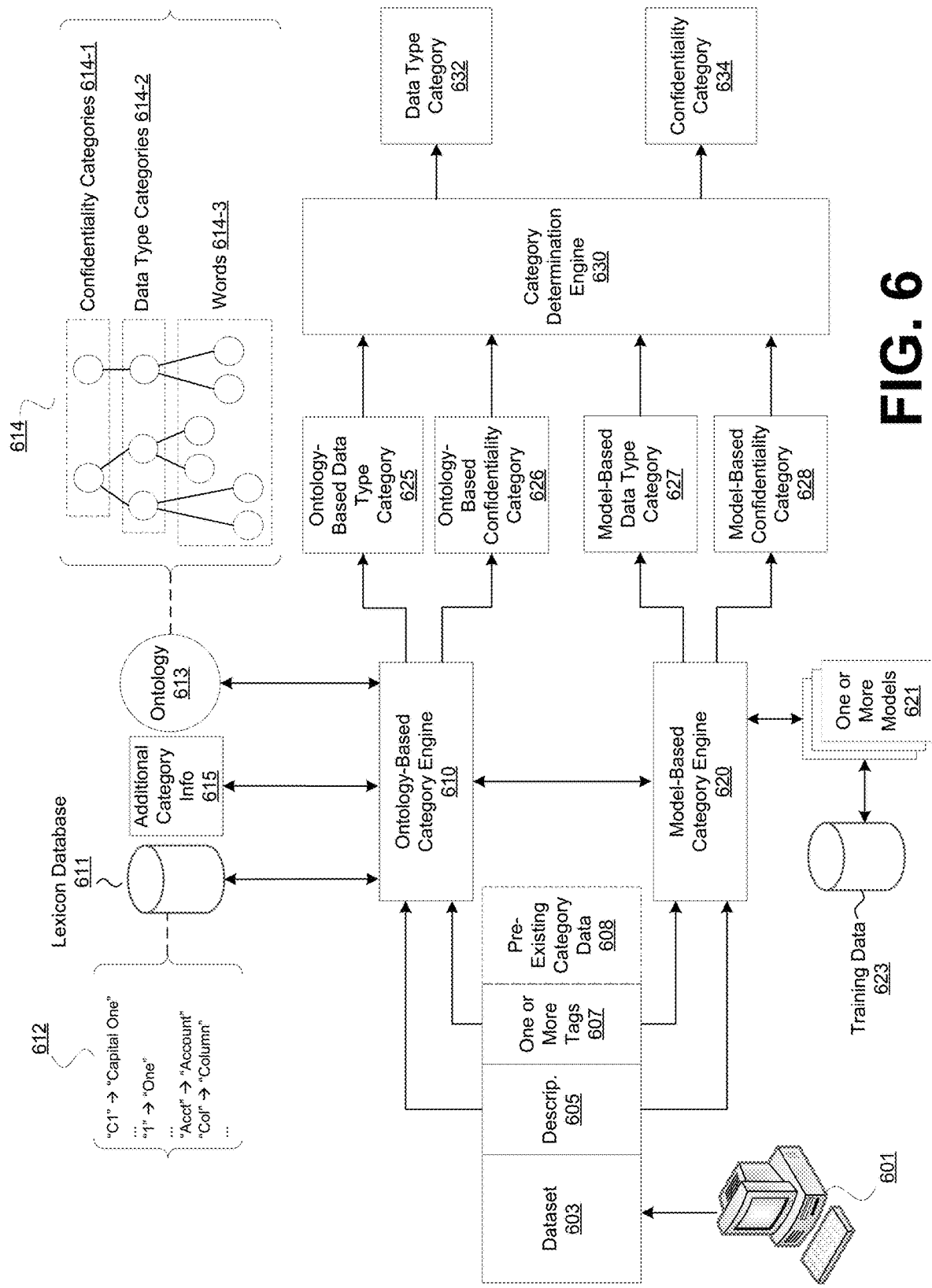
FIG. 6 depicts a block diagram of an example framework that, based on an ontology and a machine-learning model, determines one or more categories for a dataset.

FIG. 6 depicts a block diagram of an example framework that, based on an ontology and a machine-learning model, determines one or more categories for a dataset. As a brief overview, the example framework 600 of FIG. 6 depicts a dataset 603 being received from a dataset source, which is indicated by computing device 601. The dataset 603 may be the same as, or similar to, the dataset 103 of FIG. 1. For example, the dataset 603 may be formatted in one or more columns or rows. Examples of datasets that may be formatted in one or more columns or rows includes tabular data and spreadsheet data. The dataset 603 may include various types of data including, for example, numeric data, textual data, image data, audio data, and the like. As one example, the dataset 603 may include particular types of data records such as, for example, customer record data, call log data, account information, chat log data, transaction data, and the like. The examples provided in connection with dataset 603 are only a few examples of the various formats, types of data, and types of data records for the dataset 603.

The dataset 603 may be associated with one or more tags 607. The one or more tags may be similar to the one or more tags 105 of FIG. 1. For example, the one or more tags 607 may include one or more column names for the one or more columns of the dataset 603; one or more row names for the one or more rows of the dataset 603; data of a data field included by the dataset 603 (e.g., data of a particular cell, as defined by a particular row and particular column); and/or one or more items of metadata associated with the dataset 603. The one or more tags 105 may have been input by a user associated with the dataset source, generated based on tagging conventions specified in a policy or profile, and/or retrieved from a metadata repository (e.g., metadata repository 205). Each of the one or more tags 607 may include alphanumeric elements with various characteristics including, for example, snake case (e.g., "snake_case"), camel case (e.g., "CamelCase"), numeric characters (e.g., "123456789"), alphabetic characters (e.g., "abcdefABCDEF"), punctuation characters (e.g., ",."), symbolic characters (e.g., "! @#S%&*"), and any other type of characters (e.g., emojis, other Unicode character, and the like), formatting characteristics (e.g., new line character, tab character, space character), and the like.

The dataset 603 may be associated with a description 605. The description 605 may represent a user input natural language description of a row or column of the dataset 603, or a user input natural language description of the dataset 603 as a whole. Based on the description representing a user input natural language description, the description 605 may include alphanumeric characters, such as words or phrases, different from the one or more tags 605. The description 605 may include data of a data field different from the one or more tags 607 and/or one or more items of metadata different from the one or more tags. The description 605 may have been input by a user associated with the dataset source.

As will be discussed throughout this disclosure, the one or more tags 607 and/or the description 605 may be used as a basis for determining one or more categories associated with the dataset 603. The one or more categories may be associated with the dataset 603 based on a portion of the dataset 603 identified by the one or more tags 607 and/or the description 605. For example, if the description 605 includes data of a data field of the dataset 603, the portion may be the row of the dataset 603 that includes the data field. In this way and based on the categorization process described throughout this disclosure, a category may be associated with a particular row or column of the dataset 603 to indicate a categorization of the particular row or column Indeed, each column or row of the dataset 603 may be associated with its own category to indicate the various categorizations of the columns or rows of the dataset 603. Further, the one or more categories may be associated with the dataset 603 as a whole. For example, instead of being associated with a particular row or column of the dataset 603, the one or more categories may be associated with the dataset 603 as a whole to indicate categorizations of the dataset 603.

Table II illustrates examples of the one or more tags 607 and the description 605. The examples of the one or more tags 607 provided by Table II may be data from a first data field that provides an identifier for a row or column of the dataset 603. Alternatively, the examples of the one or more tags 607 provided by Table II may be a row name or a column name for the row or column of the dataset 603. The examples of the description 605 provided by Table II may be data from a second data field of the row or column that provides a user input natural language description for the row or column of the dataset 603. The examples of Table II provide only a few examples of the tags and/or descriptions that could be associated with the dataset 603.

TABLE II

Examples of the one or more tags 607 and of the description 605

| Example Row or Column Data | Example Tag(s) | Example Description(s) |
| --- | --- | --- |
| Row or column includes user information | "Brth_Dt" | "Brth_dt includes date of birth info" |
| Row or column includes customer information | "Line2Txt" | "Includes information for the second line of a user's mailing address (street name and number)" |
| Row or column includes customer information | "Line3Txt" | "Includes information for the third line of a user's mailing address" |
| Row or column includes account information | "UserID" | "Includes a user's identifier, like a social security number or other identifying information" |
| Row or column includes financial information | "AccountNum" | "Includes a user's account number" |

As seen above in Table II, the various example tags and descriptions may relate to particular categories. For example, categories based on the various example tags and descriptions provided by Table II may include user information, customer information, account information, and financial information. A category may indicate any aspect related to the row, column, or dataset. A standardized set of categories, by a categorization policy, and/or a categorization profile may define the exact categories that may be determined based on the tags and/or the descriptions. For simplicity, the examples of this disclosure will be described in terms of two different variations of categories that may be determined based on tags and/or descriptions: a data type category and a confidentiality category. Other variations of categories may be apparent based on the examples discussed throughout this disclosure.

A data type category may indicate a type of data being stored by a row of the dataset 603, a column of the dataset 603, or the dataset 603 as a whole. The following provides some examples of data type categories based on the tags and descriptions of Table II. For example, the example tag "Brth_Dt" may be related to a data type category of "user information" or "birth information". The example tags "Line2Txt" and "Line3Txt" may be related to a category of "contact information" or "address information". The example tag "UserID" may be related to a data type category of "user information" or "account information". The example tag "AccountNum" may be related to a data type category of "account information" or "transaction information". The example descriptions of Table II may be related to the same or similar data type categories as discussed with respect to the example tags of Table II.

A confidentiality category may indicate that the data being stored by a row, a column, or the dataset 603 as a whole is confidential and/or is subject to data confidentiality procedures. One example confidentiality procedure is one where access to data of the row, the column, or the dataset 603 is restricted. Another example confidentiality procedure is one where data of the row, the column, or the dataset 603 is to be prevented, or excluded, from being disclosed to any user that does not have appropriate access rights for the confidentiality category. The confidentiality procedures may be defined by one or more data security policies. For example, an enterprise may implement data security policies that restrict access to account numbers or other customer information. The confidentiality procedures may be based on one or more legal or regulatory requirements. For example, social security numbers may be subject to one or more confidentiality procedures based on one or more United States Federal laws or regulations.

As depicted in FIG. 6, the dataset 603 may be associated with pre-existing category data 608. The pre-existing category data 608 may indicate various categories for the rows, the columns, or the dataset 603 overall. The pre-existing category data 608 may have been input by a user or generated by the dataset source. In this way, the pre-existing category data 608 may include one or more pre-existing data-type categories and/or one or more pre-existing confidentiality categories. Each pre-existing data type category and/or each pre-existing confidentiality category may be associated with a row of the dataset 603, a column of the dataset 603, or the dataset 603 as a whole. The pre-existing category data 608 is depicted in FIG. 6 with dashed lines in view of it being optional and/or not relevant to some examples described throughout this disclosure. For example, as will be detailed below, examples include modifying the dataset 603 and validating the dataset 603. The pre-existing category data 608 may be used in connection with validating the dataset 603. The pre-existing category data 608 may not be used in connection with modifying the dataset 603.

As depicted in FIG. 6, the one or more tags 607 and/or the description 605 may be processed to determine a data type category 632 and/or a confidentiality category 634. In particular, the one or more tags 607 and/or the description 605 may be processed via an ontology-based category engine 610, a model-based category engine 620, and a category determination engine 630. Each of the ontology-based category engine 610, the model-based category engine 620, and the category determination engine 630 may be configured to perform particular processes in connection with determining the data type category 632 and the confidentiality category 634. The ontology-based category engine 610, the model-based category engine 620, and the category determination engine 630 may be implemented, or executed, by one or more computing devices.

As a general overview to the processes performed in connection with determining the data type category 632 and the confidentiality category 634, the ontology-based engine 610 may process the one or more tags 607 and/or the description 605 based on, among other things, a lexicon database 611, supplementary category information 615, and an ontology 613. The processing of the ontology-based engine 610 may result in the determination of the ontology-based data type category 625 and/or the ontology-based confidentiality category 626. The model-based category engine 620 may process the one or more tags 607 and/or the description 605 based on, among other things, one or more models 621. The processing of the model-based category engine 620 may result in the determination of the model-based data type category 627 and/or the model-based confidentiality category 628. The category determination engine 630 may determine the data type category 632 and/or the confidentiality category 634 based on the ontology-based data type category 625, the ontology-based confidentiality category 626, the model-based data type category 627, and/or the model-based confidentiality category 628.

The ontology-based category engine 610 may be configured to perform pre-processing on the one or more tags 607 and/or the description 605 based on the lexicon database 611. The lexicon database 611 may be the same as, or similar to, the lexicon database 115 of FIG. 1. The lexicon database 611 may include mapping information that indicates conversions for various abbreviations and alphanumeric elements. In this way, the one or more tags 607 and/or the description 605 may be processed based on the mapping information of the lexicon database 611. As depicted in FIG. 6, lexicon database 611 includes mapping information 612. Mapping information 612 includes, among other mappings, a mapping for converting an alphanumeric abbreviation element of "C1" to "Capital One"; a mapping for converting the numeric element of "1" to "One"; a mapping for converting an abbreviated character element of "Acct" to "Account"; and a mapping for converting an abbreviated character elements of "Col" to "Column". Various other example mappings will be apparent based on the examples discussed throughout this disclosure. Indeed, mappings may be configured for any anticipated tagging convention.

The ontology-based category engine 610 may be configured to determine, based on the pre-processing, search data that is usable for searching the ontology 613 and/or the additional category information 615. As depicted in FIG. 6, ontology 613 is represented as interrelated nodes 614. The interrelated nodes 614 may include words 614-3, data type categories 614-2, and confidentiality categories 614-1. The search may be performed by identifying, based on the search data, one or more of the words 604-3 and identifying, based on relationships of the interrelated nodes 614, one or more data type categories 614-2 and/or one or more confidentiality categories 614-1. The ontology 613 may include the ontology 113 of FIG. 1. For example, the standardized tags of the ontology 113 may be included as part of the words 614-3.

The words 614-3, the data type categories 614-2, the confidentiality categories 614-1, and their relationships may organize the interrelated nodes 614 into a hierarchy. As depicted in FIG. 6, relationships may be defined between the confidentiality categories 614-1 and the data type categories 614-2 higher in the hierarchy. Lower in the hierarchy, relationships may be defined between the data type categories 614-2 and the words 614-3. In this way, the words 614-3 may be associated with the confidentiality categories 614-1 and the data type categories 614-2. The depicted hierarchy of the interrelated nodes 614 is one example of the manner in which the words 614-3, the data type categories 614-2, the confidentiality categories 614-1 may be organized.

In addition to searching the ontology 613, the ontology-based category engine 610 may be configured to search the additional category information 615 using the search data. The additional category information 615 may include mapping information that indicates associations between words and one or more data type categories and/or one or more confidentiality categories. Based on any categories found based on the search, the ontology-based category engine 610 may determine the ontology-based data type category and/or the ontology-based confidentiality category. The additional category information 615 may be different from, or supplementary to, the ontology 613. For example, the mapping information of the additional category information 615 may represent an update to the ontology 613 that has yet to be incorporated into the ontology 613. In this way, the additional category information 615 may include categories not currently defined in ontology 613 and/or may include a relationship between a word and a category that is not currently defined in the ontology 613.

Figure 7:
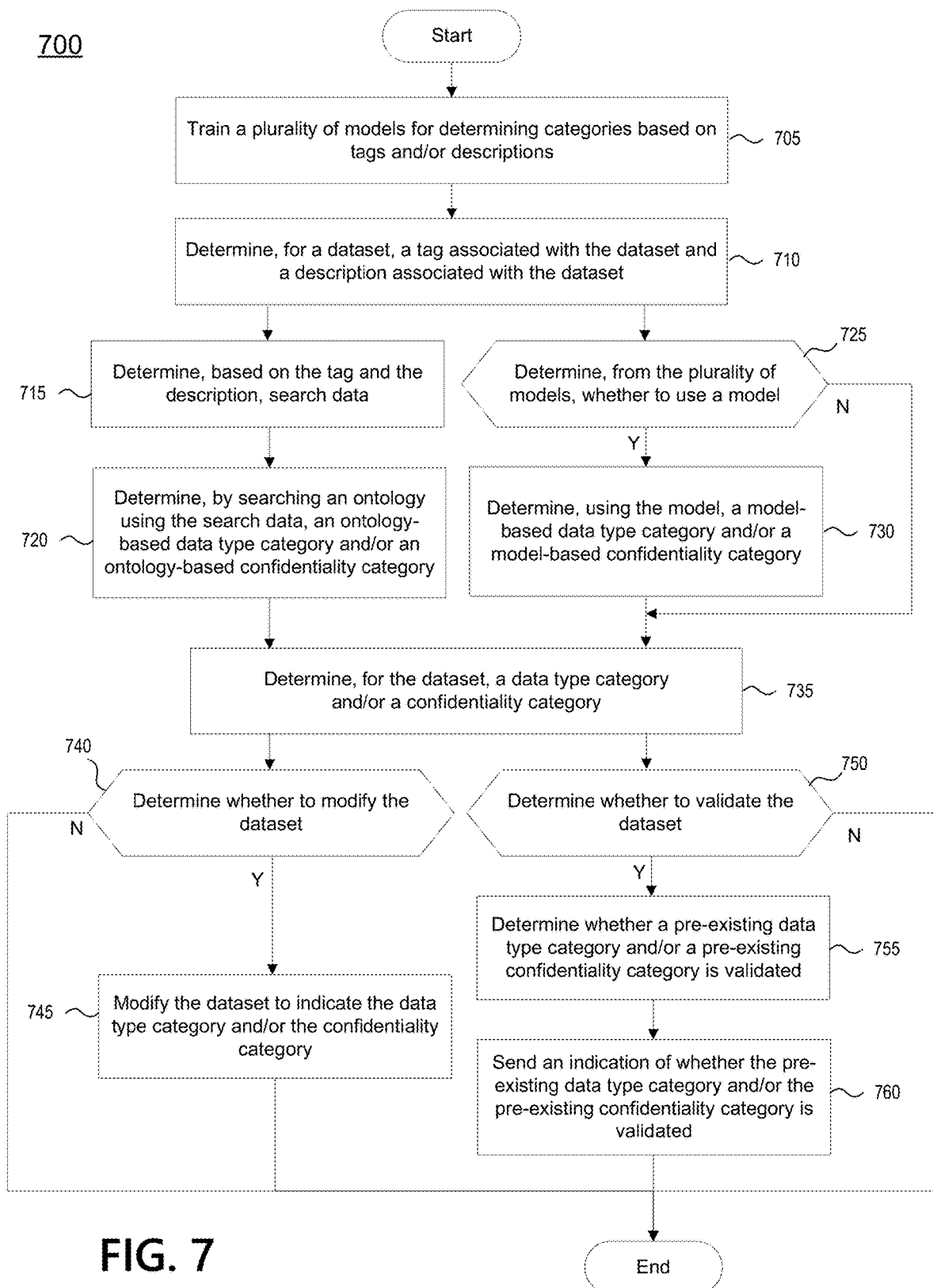
FIG. 7 depicts an example method that may, based on an ontology and a machine-learning model, determine one or more categories associated with a dataset.
Figure 8:
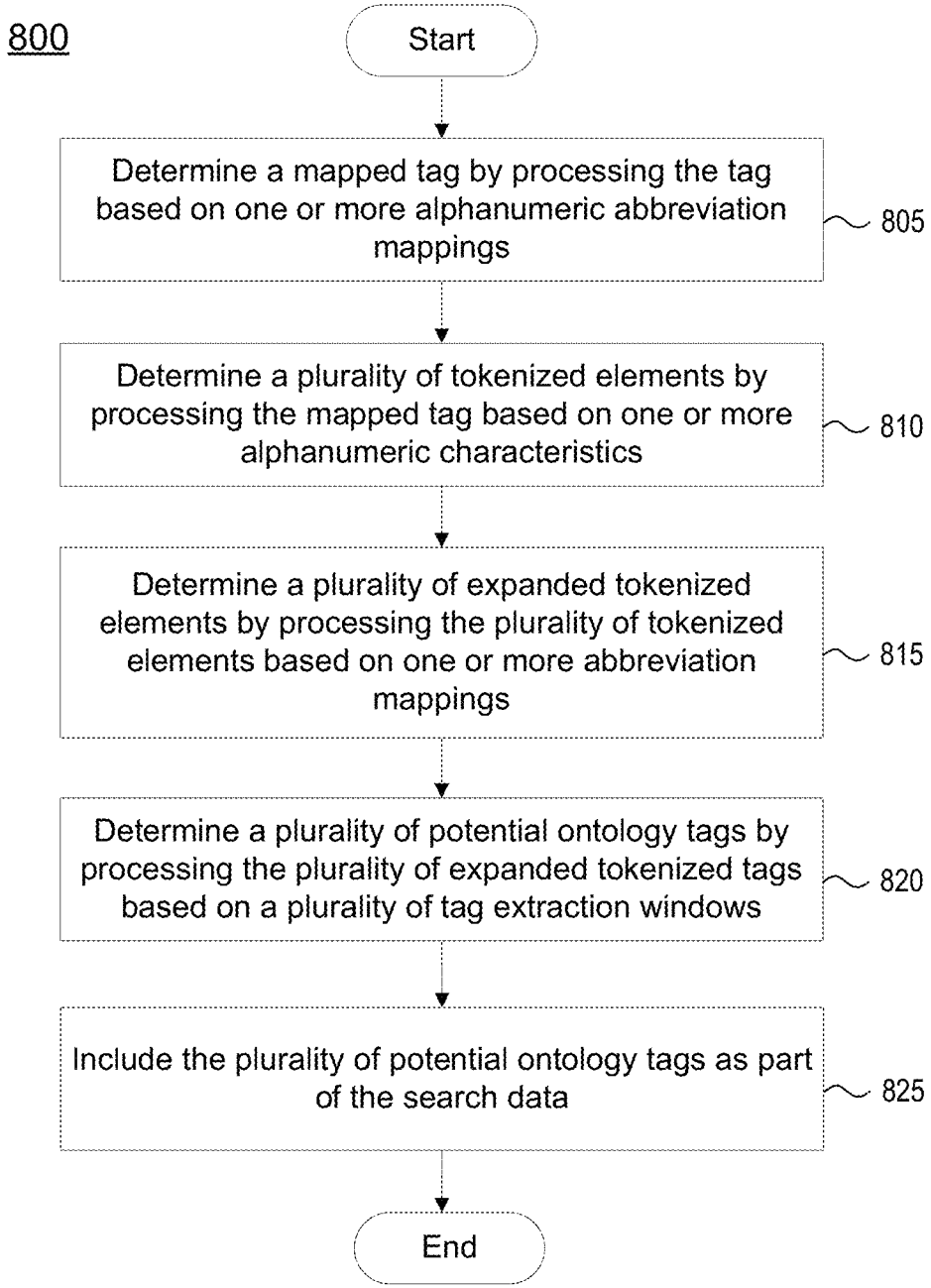
FIGS. 8 and 9 depict two example methods for determining search data that is usable for searching an ontology.
Figure 9:
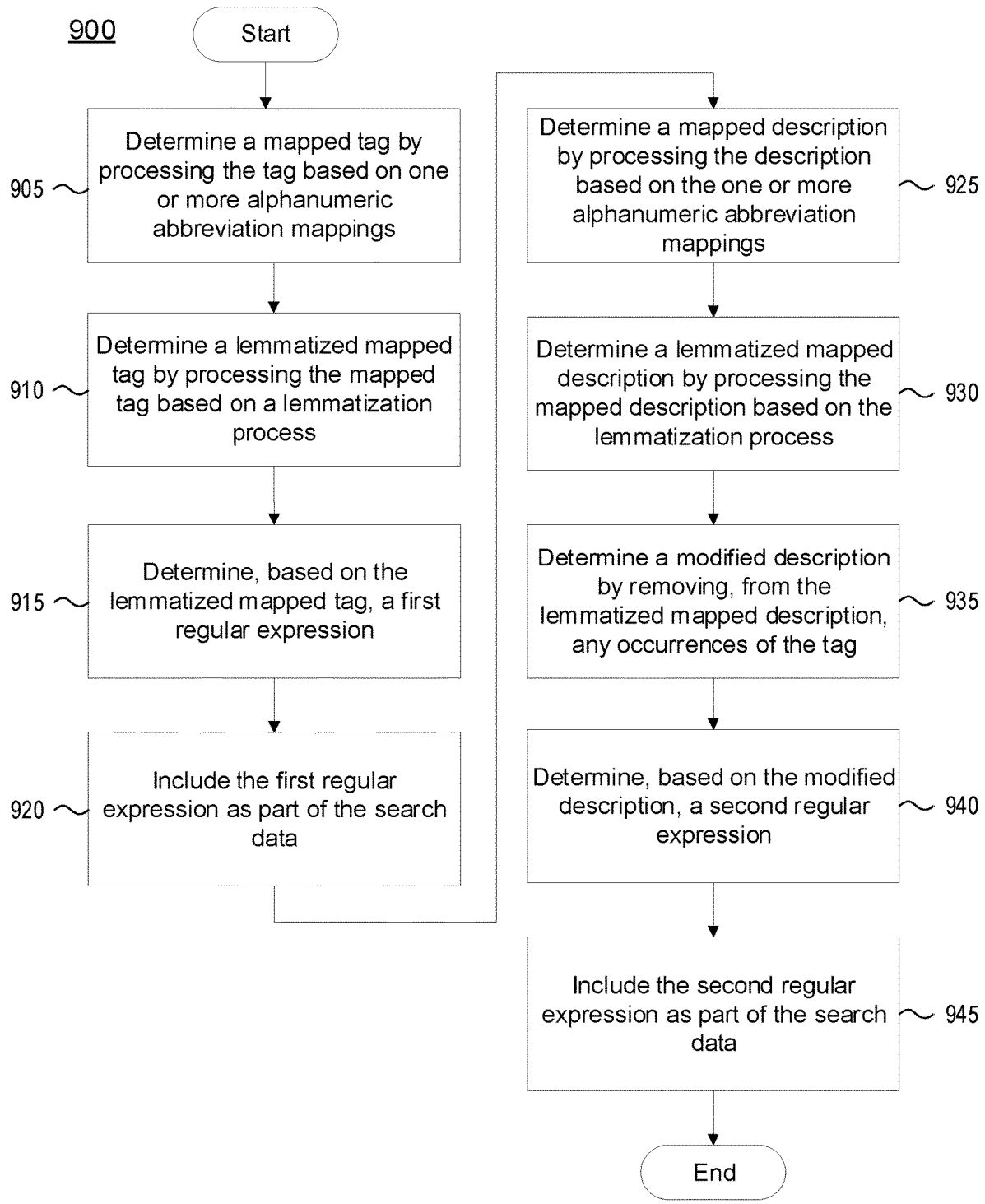

Additional details on the processing of the ontology-based category engine 610 and the searching of the ontology 613 are provided below in connection with FIGS. 7-9. In particular, FIG. 7 depicts an example method that, among other things, may search the ontology 613 using search data. FIGS. 8 and 9 depict example methods for determining search data that may be usable for searching the ontology 613. The additional category information 615 may be searched similar to the process described in connection with FIG. 7 using search data determined based on the example methods of FIGS. 8 and 9.

The model-based category engine 620 may be configured to use a model to determine the model-based data type category 627 and/or the model-based confidentiality category 628. The model-based category engine 620 may be configured to provide, as input to the model, the one or more tags 607 and/or the description 605, or other input data based on the one or more tags 607 and/or the description 605. Based on the input, the model-based category engine 620 may be configured to receive, as output from the model, the model-based data type category 627 and/or the model-based confidentiality category 628. As depicted in FIG. 6, the model-based category engine 620 may be configured to use any of the one or more models 621 when determining the model-based data type category 627 and/or the model-based confidentiality category 628. The one or more models 621 may include one or more naïve Bayes classifiers, one or more neural networks, or some other suitable machine-learning model. The one or more models 621 may be trained, based on the training data 623, using a supervised learning process or other suitable training process.

The one or more models 621 may be configured to output data type categories and/or confidentiality categories for one or more model-supported tags. In other words, each model may be configured for a particular model-supported tag. A model-supported tag may be any one of the standardized tags (e.g., as discussed in connection with the ontology 113 of FIG. 1). For example, if each example tag of Table II corresponds to a particular standardized tag (e.g., the tag "AccountNum" may correspond to a standardized tag of "Account Number"), the five example tags of Table II would correspond to five standardized tags. If a model was trained for each of the five standardized tags, the one or more models 621 would include at least these five models. Each of the five models may be configured to output data type categories and/or confidentiality categories for its particular standardized tag of the five standardized tags (e.g., one of the five models may be configured to output data type categories and/or confidentiality categories for the "Account Number" standardized tag, a second of the five models may be configured to output data type categories and/or confidentiality categories for the "Birthdate" standardized tag, etc.).

Additional details on the processing of the model-based category engine 620, and the training and use of the one or more models 621 are provided below in connection with FIG. 7. In particular, FIG. 7 depicts an example method that, among other things, may train a plurality of models, and may use a model to determine a model-based data type category and/or a model-based confidentiality category.

Further, the ontology-based category engine 610 and the model-based category engine 620 are shown as being in communication with each other so that the one or more tags 607, the description 605, and any data resulting from any pre-processing or other processing performed by the engines 610 and 620 can be communicated to each other. For example, the ontology-based category engine 610 may be configured to determine, for the dataset 603, the one or more tags 607 and/or the description 605. Once determined, the ontology-based data category 610 may send the one or more tags 607 and/or the description to the model-based category engine 620. The model-based category engine 620 may be configured to, based on receiving the one or more tags 607 and/or description 605, provide the one or more tags 607 and/or the description 605 as input to a model. As another example, the ontology-based category engine 610 may be configured to send the model-based category engine 620 data resulting from the pre-processing performed on the one or more tags 607 and/or the description 605. Continuing this example, the model-based category engine 620 may be configured to, based on receiving the data, provide this data as input to the model (e.g., the data resulting from the pre-processing may be provided as input to the model instead of the one or more tags 607 and/or the description 605).

The category determination engine 630 may be configured to determine the data type category 632 and/or the confidentiality category 634 based on one or more rules that are applied to the ontology-based data type category 625, the ontology-based confidentiality category 626, the model-based data type category 627, and/or the model-based confidentiality category 628. The one or more rules may be based on various comparisons, thresholds, priorities, confidence determinations, and/or other analyses that can be used as a basis for selecting which of the various ontology-based or model-based categories 625-628 to use as the data type category 632 and/or the confidentiality category 634. For example, the category determination engine 630 may be configured to determine the data type category 632 based on a rule that requires a match between the ontology-based data type category 625 and the model-based data type category 627. As another example, the category determination engine 630 may be configured to determine the data type category 632 based on a threshold of words identified by the search of the ontology 613. Continuing this example, during the search, a count of words may be determined that indicates how many times the search identified one of the words 614-3 based on the search data. If the count of words is greater than a threshold, then the category determination engine 630 may be configured to determine the data type category 632 by selecting the ontology-based data type category 625. As yet another example, the category determination engine 630 may be configured to determine the data type category 632 based on a prioritization of the model-based data type category. Continuing this example, the category determination engine 630 may be configured to determine the data type category 632 by selecting the model-based data type category 627 any time it is received from the model-based category engine 620. As another example, the category determination engine 630 may be configured to determine the data type category 632 based on a rule that compares confidence values associated with the various ontology-based or model-based categories 625-628. For the ontology-based data type category 625 and the ontology-based confidentiality category 626, one or more ontology-based confidence values may be determined during or based on the search of the ontology 613. For the model-based data type category 627 and the model-based confidentiality category, one or more model-based confidence values may be determined during or based on the use of a model (e.g., the one or more models 621 may be configured to output model-based confidence values in addition to outputting the model-based categories). The category determination engine 630 may be configured to determine the data type category 632 based on a comparison of the one or more ontology-based confidence values and the one or more model-based confidence values. Similar example rules could be used to determine the confidentiality category 634. As yet another example, the category determination engine 630 may be configured to determine the data type category 632 based on one or more similarity measurements (e.g., cosine similarity based on the search of the ontology); and/or one or more model accuracy measurements (e.g., a classification accuracy in a range of 0-100% for the model that was used). Various other example rules will be apparent based on the examples discussed throughout this disclosure.

Figure 10:
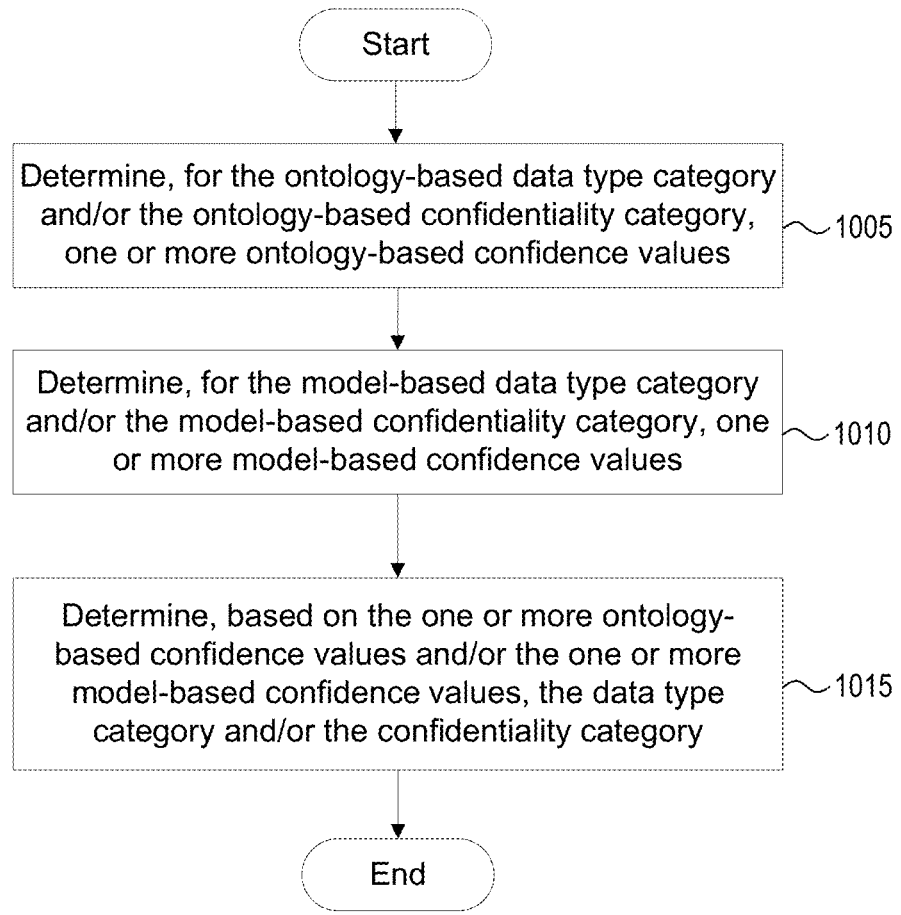
FIG. 10 depicts an example method that determines the one or more categories based on one or more ontology-based confidence values and one or more machine-learning model-based confidence values.

Additional details on the processing of the category determination engine 630, and the manner in which the data type category 632 and/or the confidentiality category 634 may be determined, are provided below in connection with FIGS. 7 and 10. In particular, FIG. 7 depicts an example method that, among other things, may determine the data type category 632 and/or the confidentiality category 634. FIG. 10 depicts an example method for determining the data type category 632 and/or the confidentiality category 634 based on ontology-based and model-based confidence values. Table III, which is discussed in connection with FIG. 10, includes additional examples of the manner in which the data type category 632 and/or the confidentiality category 634 may be determined.

While the examples depicted in FIG. 6 and discussed in connection with the category determination engine 630 result in a single data type category 632 and a single confidentiality category being determined, the category determination engine 630 may be configured to determine a plurality of data type categories and/or a plurality of confidentiality categories. For example, both the ontology-based data type category and the model-based data category may be included in the plurality of data type categories. Both the ontology-based confidentiality category and the model-based confidentiality category may be included in the plurality of data type categories. Table III provides one example where a plurality of categories may be determined.

The example framework 600 of FIG. 6 could be used in a number of computing environments. One example computing environment is an enterprise computing environment that, among other things, stores and manages the datasets for an enterprise. The example framework 600 may be incorporated into an enterprise computing environment to determine data type categories and/or confidentiality categories for datasets. The data type categories and/or confidentiality categories may be used to modify the datasets and/or to validate the datasets. Further, the example framework 600 may be incorporated into an enterprise computing environment to allow for an enterprise to implement a categorization policy and/or a validation policy. For example, the categorization policy may include modifying the datasets to indicate the data type categories and/or confidentiality categories. In this way, the datasets, once modified and indexed into a searchable index, could be searched based on the data type categories. As another example, one or more confidentiality procedures may be applied to the data sets based on the confidentiality categories. FIG. 2, discussed above, provides one example enterprise computing environment 200 in which the example framework 600 may be incorporated to implement a categorization policy and/or a validation policy.

Having discussed the example framework 600 of FIG. 6, example methods that may be performed by one or more computing devices based on the example framework 600 will be discussed. The example methods are depicted by FIGS. 7-10.

FIG. 7 depicts an example method 700 that may, based on an ontology and a machine-learning model, determine one or more data type categories associated with a dataset and/or one or more confidentiality categories associated with the dataset. Method 700 may be implemented by one or more suitable computing devices, as described herein. For example, method 700 may be implemented by a computing device (e.g., dataset tag processing server 207; and/or any one of computing devices 1101, 1105, 1107, and 1109 of FIG. 11), and/or combination of computing devices (e.g., a combination of dataset tag processing server 207 and any other device of the enterprise computing environment 200; and/or a combination of computing devices 1101, 1105, 1107, and 1109 of FIG. 11). Method 700 may be implemented in suitable computer-executable instructions, such as in dataset processing software 1127. Method 700 may also include access of an ontology and/or a lexicon database, such as ontology 613 and lexicon database 611 of FIG. 6. The ontology and lexicon database may be stored as lexicon and ontology data 1129 of FIG. 11 or as part of some other database. Method 700 may also include access of training data for training a machine-learning model, such as training data 623 and one or more models 621 of FIG. 6. The training data may be stored as training data 1130 of FIG. 11 or as part of some other database.

At step 705, the one or more computing devices may train a plurality of models for determining categories based on tags and/or descriptions. The plurality of models may include one or more naïve Bayes classifiers, one or more neural networks, and/or one or more other suitable machine-learning model. The training may be performed based on a supervised learning process or other suitable training process, and training data stored in a database (e.g., training data 623 of FIG. 6). Each of the plurality of models may be configured to receive, as input, one or more tags and/or one or more descriptions. Each of the plurality of models may be configured to provide, as output, one or more model-based categories and/or one or more confidence values for the one or more model-based categories. The one or more model-based categories may include, for example, a model-based data type category and/or a model-based confidentiality category. The plurality of models may be configured to output model-based data type categories and/or model-based confidentiality categories for a plurality of model-supported tags. In other words, each model of the plurality of models may be configured for a particular model-supported tag of the plurality of model-supported tags. The plurality of models may be the same as, or similar to, the one or more models 621 of FIG. 6.

The above step 705 may be performed at some arbitrary point prior to the following steps 710-760. The following steps 710-760 may be performed based on the one or more computing devices receiving a dataset (e.g., dataset 603 of FIG. 6) from a dataset source. The following steps 710-760 may represent the processes performed by the various engines 610, 620, and 630 of FIG. 6. Additionally, while the example framework 600 of FIG. 6 was discussed with respect to determining categories based on one or more tags (e.g., one or more tags 607), the following steps 710-760, for simplicity, will be discussed with respect to a tag (e.g., a single tag of the one or more tags 607). The processes applied to the tag in the following steps 710-760 could be applied to additional tags when determining categories based on a plurality of tags. Further, the following steps 710-760 could be repeated for additional tags when determining categories based on a plurality of tags. When repeating the following steps 710-760 for additional tags, the same description or a different description may be used.

At step 710, the one or more computing devices may determine, for a dataset, a tag associated with the dataset and a description associated with the dataset. The tag associated with the dataset may be the same as, or similar to, a tag from the one or more tags 607 of FIG. 6. For example, the tag associated with a dataset may include a column name for a column of the dataset, a row name for a row of the dataset, data of a data field included by the data set, or an item of metadata associated with the dataset. The description associated with the dataset may be the same as, or similar to, the description 605 of FIG. 6. For example, the description associated with the dataset may represent a user input natural language description of a row or column of the dataset, or a user input natural language description of the dataset as a whole. Based on the description representing a user input natural language description, the description may include alphanumeric characters, such as words or phrases, different from the tag. The description may include data of a data field different from the tag and/or one or more items of metadata different from the tag.

Based on determining the tag and the description, the example method 700 is depicted as proceeding to steps 715-720 and also proceeding to steps 725-730. Steps 715-720 may be performed in parallel with steps 725-730. For example, steps 715-720 may be performed in a first thread and steps 725-730 may be performed in a second thread. The parallel performance of steps 715-720 and steps 725-730 is only one example of the order in which steps 715-730 can be performed. As another example, steps 715-730 may be performed sequentially.

At step 715, the one or more computing devices may determine, based on the tag and the description, search data. This determination may be performed by processing the tag and/or the description in various ways including, for example, based on standardized tags and/or based on regular expressions. The processing performed for this determination may be the same as, or similar to, the pre-processing performed by the ontology-based category engine 610 of FIG. 6. Additionally, example methods for determining the search data are discussed below with respect to FIGS. 8 and 9. FIG. 8 depicts an example method 800 for determining search data that is usable for searching an ontology. FIG. 9 depicts an example method 900 for determining search data that is usable for searching an ontology. Accordingly, additional details of the search data will be provided in connection with FIGS. 8 and 9. With respect to the example method of FIG. 8, the search data, once determined, may include characters, words, or phrases that are usable to search an ontology (e.g., ontology 613 of FIG. 6). With respect to the example method of FIG. 9, the search data, once determined, may include one or more regular expressions that are usable to search the ontology. Further, the search data may include a first portion determined based on the tag (e.g., a first regular expression determined based on the tag) and a second portion determined based on the description (e.g., a second regular expression determined based on the description).

At step 720, the one or more computing devices may determine, by searching the ontology using the search data, an ontology-based data type category and/or an ontology-based confidentiality category. The searching may be performed similar to the searching performed by the ontology-based category engine 610 of FIG. 6. For example, the searching may include identifying one or more words (e.g., words 614-3) of the ontology based on the characters, words, phrases, or regular expressions of the search data. Based on any relationship defined in the ontology for the one or more words, one or more data type categories (e.g., data type categories 614-2) and/or one or more confidential categories (e.g., confidential categories 614-1) may be identified. The ontology-based data type category may be selected from the one or more data type categories. If a plurality of data type categories are identified by the search, the selection may be performed based on one or more characteristics of the search. For example, if a first of the identified data type categories is associated with 5 words identified based on the search data and a second of the identified data type categories is associated with 3 words identified based on the search data, the first may be selected as the ontology-based data type category. The ontology-based confidentiality category may be selected from the one or more data type categories. If a plurality of data-type categories are identified by the search, the selection may be performed based on one or more characteristics of the search. For example, if a first of the identified confidentiality categories is associated with 3 data type categories identified during the search and a second of the identified confidentiality categories is associated with 1 data type category identified during the search, the first may be selected as the ontology-based confidentiality category.

The determination of the ontology-based data type category and/or an ontology-based confidentiality category may also be based on additional category information. For example, an additional search of the additional category information may be performed using the search data. The additional category information may be the same as, or similar to, the additional category information 615 of FIG. 6. The searching of the additional category information may be performed the same as, or similar to, the manner in which the ontology-based category engine 610 of FIG. 6 searches the additional category information 615.

As the search of the ontology and/or the additional search of the additional category information are performed, a historical record may be generated. The historical record may include, or otherwise indicate, one or more characteristics of the search of the ontology and/or the additional search of the additional category information. The historical record may be used at step 735.

The historical record may include various counts that indicate how many times the search and/or the additional search identified words based on the search data. For example, each word identified based on the search data may include its own count in the historical record. The historical record may include various counts that indicate how many times the search and/or the additional search identified categories. For example, each data type category and each confidentiality category identified during the search may include its own count in the historical record.

The historical record may include various ontology-based confidence values that indicate a measure of confidence in the ontology-based data type category and/or the ontology-based confidentiality category (e.g., a value indicating a high confidence, a medium confidence, a low confidence value, and/or a value within a numeric range). For example, the historical record may include an ontology-based data type confidence value that indicates a measure of confidence in the ontology-based data type category. The historical record may include an ontology-based confidentiality confidence value that indicates a measure of confidence in the ontology-based confidentiality category. Continuing this example, as discussed above, the search data may include a first portion determined based on the tag and a second portion determined based on the description. Continuing this example, the historical record may include an ontology-based confidentiality confidence value that indicates a high confidence for the ontology-based confidentiality category if the ontology-based confidentiality category was identified during the search and/or the additional search based on both the first portion and the second portion. Continuing this example, the historical record may include an ontology-based confidentiality confidence value that indicates a high confidence for the ontology-based confidentiality category if the ontology-based confidentiality category was identified during the search and/or the additional search based on the first portion and if the ontology-based confidentiality category is associated with one or more confidentiality categories identified based on the second portion. Continuing this example, the historical record may include an ontology-based confidentiality confidence value that indicates a medium confidence for the ontology-based confidentiality category if the ontology-based confidentiality category was identified during the search and/or the additional search based on the first portion and not based on the second portion. Continuing this example, the historical record may include an ontology-based confidentiality confidence value that indicates a low confidence for the ontology-based confidentiality category if the conditions of the previous confidence values were not satisfied. As one example of a low confidence value, the historical record may include an ontology-based confidentiality confidence value that indicates a low confidence for the ontology-based confidentiality category if the ontology-based confidentiality category was identified during the search based on the second portion and not based on the first portion.

After determining the ontology-based data type category and/or the ontology-based confidentiality category, the method may proceed to step 735. The one or more computing devices may wait to perform step 735 until steps 725-730 have been completed.

At step 725, the one or more computing devices may determine, from the plurality of models trained at step 705, whether to use a model to determine one or more model-based categories. In general, this determination may be performed by determining whether any of the plurality of models has been trained to output model-based data type categories and/or model-based confidentiality categories for the tag. For example and using an example tag provided by Table II, if the tag is "AccountNum", the one or more computing devices may determine to use the model that is trained to output model-based data type categories and/or model-based confidentiality categories for account numbers and may, therefore, proceed to step 730. If no model is trained to output model-based data type categories and/or model-based confidentiality categories for account numbers, the one or more computing devices may determine to not use a model and may, therefore, proceed to step 735. If no model is trained to output model-based data type categories and/or model-based confidentiality categories for account numbers, the data type category and/or confidentiality category determined at step 735 will be based only on the ontology-based categories, as no model-based categories would have been determined.

The determination of whether to use a model may be performed based on identifying a correspondence between the tag and a plurality of model-supported tags. As discussed above, the plurality of models may be configured to output model-based data type categories and/or model-based confidentiality categories for a plurality of model-supported tags. To identify a correspondence between the tag and the plurality of model-supported tags, the tag, or a processed version of the tag, may be compared to the plurality of model-supported tags. For example, if the tag matches one of the plurality of model-supported tags, the one or more computing devices may determine that the model configured to output model-based data type categories and/or model-based confidentiality categories for the matched model-supported tag is to be used and may proceed to step 730. If the tag does not match any of the plurality of model-supported tags, the one or more computing devices may determine that none of the plurality of models will be used and may proceed to step 735. As another example, a processed version of the tag may be a mapped tag resulting from processing the tag based on a lexicon database (e.g., lexicon database 611 of FIG. 6). Continuing this example, if the processed version of the tag matches one of the plurality of model-supported tags, the one or more computing devices may determine that the model configured to output model-based data type categories and/or model-based confidentiality categories for the matched model-supported tag is to be used and may proceed to step 730. If the processed version of the tag does not match any of the plurality of model-supported tags, the one or more computing devices may determine that none of the plurality of models will be used and may proceed to step 735.

At step 730, the one or more computing devices may determine, using the model, a model-based data type category and/or a model-based confidentiality category. This determination may be performed based on the tag and/or the description. For example, the tag and/or the description may be sent, as input, to the model determined at step 725. As another example, a processed version of the tag may be sent, as input, to the model instead of the tag. The processed version of the tag may be a mapped tag resulting from processing the tag based on the lexicon database, or a lemmatized mapped tag resulting from processing the mapped tag based on a lemmatization process (discussed below with respect to FIG. 9). As yet another example, a processed version of the description may be sent, as input, to the model instead of the description. The processed version of the description may be a mapped description resulting from processing the tag based on the lexicon database (discussed below with respect to FIG. 9), or a lemmatized mapped description resulting from processing the mapped description based on the lemmatization process (discussed below with respect to FIG. 9). Based on the input, the model may provide, as output, the model-based data type category and/or the model-based confidentiality category.

Additionally, the model-based data type category and/or the model-based confidentiality category may each be associated with various model-based confidence values. Each of these model-based confidence values may have been determined by the model and provided, as output from the model, along with the model-based data type category and/or the model-based confidentiality category. Each of the model-based confidence values may indicate a measure of confidence in the model-based data type category and/or the model-based confidentiality category (e.g., a value indicating high confidence, medium confidence, low confidence, and/or a value within a numeric range). For example, the model may output a model-based data type confidence value that indicates a measure of confidence in the model-based data type category. The model may output a model-based confidentiality confidence value that indicates a measure of confidence in the model-based confidentiality category. These one or more model-based confidence values may be used at step 735.

After determining the model-based data type category and/or the model-based confidentiality category at step 730 or after it is determined that none of the plurality of models are to be used at step 725, the method may proceed to step 735. The one or more computing devices may wait to perform step 735 until steps 715-720 have been completed.

At step 735, the one or more computing devices may determine, for the dataset, a data type category and/or a confidentiality category. This determination may be performed based on the ontology-based data type category, the ontology-based confidentiality category, the model-based data type category, and/or the model-based confidentiality category. This determination may be performed the same as, or similar to, the discussion of the category determination engine 630 of FIG. 6. For example, one or more rules may be applied to the ontology-based data type category, the ontology-based confidentiality category, the model-based data type category, and/or the model-based confidentiality category. The one or more rules may be based on various comparisons, thresholds, priorities, confidence determinations, and/or other analyses that can be used as a basis for selecting which of the various ontology-based or model-based categories to use as the data type category and/or the confidentiality category. Any of the example rules discussed in connection with the category determination engine 630 may be applied as part of the determination at step 735. Further, the one or more rules may cause information included in the historical record to be analyzed. The historical record was generated based on the search of the ontology and/or the additional search of the additional category information, and was discussed in connection with step 720. The one or more rules may cause the one or more model-based confidence values to be analyzed. The one or more model-based confidence values may have been output from the model in association with the model-based data type category and/or the model-based confidentiality category, and were discussed in connection with step 730.

Continuing the discussion of the determination at step 735, FIG. 10 provides additional examples related to the determination of the data type category and/or the confidentiality category. Table III, which is discussed in connection with FIG. 10, includes additional examples for which the determination at step 735 may be performed. Further, additional examples of the one or more rules discussed in connection with the determination at step 735 are apparent in view of Table III.

After determining the data type category and/or the confidentiality category, the one or more computing devices may use these categories in various ways. As depicted in the example method 700, the one or more computing devices may modify the dataset based on the data type category and/or the confidentiality category at steps 740-745. As also depicted in the example method 700, the one or more computing devices may validate pre-existing category data associated with the dataset at steps 750-760. Steps 740-745 may be performed in parallel with steps 750-760. For example, steps 740-745 may be performed in a first thread and steps 750-760 may be performed in a second thread. The parallel performance of steps 740-745 and steps 750-760 is only one example of the order in which steps 740-760 can be performed. As another example, steps 740-760 may be performed sequentially.

At step 740, the one or more computing devices may determine whether to modify the dataset. This determination may be performed based on categorization configuration data that indicates whether the dataset is to be modified based on the data type category and/or the confidentiality category. The categorization configuration data may indicate whether one or more categorization uses are active (e.g., whether modifying the dataset is active, whether validating the dataset is active). For example, the confidential configuration data may include an indication of whether modifying the dataset is active. If the categorization configuration data indicates that modifying the dataset is active, the method may proceed to step 745. If the categorization data indicates that modifying the dataset is not active, the method may end.

At step 745, the one or more computing devices may modify the dataset to indicate the data type category and/or the confidentiality category. For example, the dataset may be modified to associated the data type category and/or the confidentiality category to a portion of the dataset or the dataset as a whole. For example, if the data type category and/or the confidentiality category are to be associated with a portion of the dataset and if the dataset is formatted into rows and columns, a column may be appended to the dataset to indicate, for a particular row, the ontology-based category and/or the model-based category. The particular row may be determined based on where the tag or the description is located in the dataset. For example, the particular row might be the row where the description is found in the dataset. As another example, if the data type category and/or the confidentiality category are to be associated the dataset as a whole, the metadata associated with the dataset may be modified to indicate the data type category and/or the confidentiality category. By associating the data type category and/or the confidentiality category to a portion of the dataset or the dataset as a whole, the dataset may be searched for based on the data type category and/or the confidentiality category. Further, by associating the data type category and/or the confidentiality category to a portion of the dataset or the dataset as a whole, the portion of the dataset or the dataset as a whole may be indicated as being confidential. Additionally, by associating the data type category and/or the confidentiality category to a portion of the dataset or the dataset as a whole, portion of the dataset or the dataset as a whole may be subject to one or more confidentiality procedures.

At step 750, the one or more computing devices may determine whether to validate the dataset. This determination may be performed based on the existence of pre-existing category data for the dataset. For example, if the dataset includes pre-existing category data (e.g., pre-existing category data 608 of FIG. 8), the method may proceed to step 755. If the dataset does not include pre-existing category data, the method may end. Additionally, this determination may be performed based on categorization configuration data. The categorization configuration data may be the same as, or similar to, the categorization configuration data discussed in connection with step 740. For example, the confidential configuration data may include an indication of whether validation of the dataset is active. If the categorization configuration data indicates that validation the dataset is active, the method may proceed to step 755. If the categorization data indicates that modifying the dataset is not active, the method may end.

At step 755, the one or more computing devices may determine whether a pre-existing data type category and/or a pre-existing confidentiality category is validated. The pre-existing data type category and/or the pre-existing confidentiality category may be included in the pre-existing category data (e.g., pre-existing category data 608 of FIG. 8) of the dataset. Whether the pre-existing data type category is validated may depend on whether the pre-existing data type category and the data type category determined at step 735 match each other. Similarly, whether the pre-existing confidentiality category is validated may depend on whether the pre-existing confidentiality category and the confidentiality category determined at step 735 match each other. For both the pre-existing data type category and the pre-existing confidentiality category, the validation may pass if a match is found and the validation may fail if a match is not found.

At step 760, the one or more computing devices may send an indication of whether the pre-existing data type category and/or the pre-existing confidentiality category is validated. This indication may indicate whether the validation of the pre-existing data type category passed or failed. This indication may indicate whether the validation of the pre-existing confidentiality category passed or failed. Further, this indication may indicate whether either the validation of the pre-existing data type category or the validation of the pre-existing confidentiality category has failed. Based on this indication, additional actions may be performed by the one or more computing devices and/or a user. For example, if the indication indicates that the validation passes, the one or more computing devices may cause the dataset to be integrated into one or more databases and/or a searchable index (e.g., the searchable index 123 of FIG. 1). If the indication indicates that the validation fails, a user may further review the dataset to determine the correct categorization. For example, the user may review the dataset to identify whether it includes confidential data and the user may modify the pre-existing categorization data to indicate whether the dataset includes confidential data.

FIG. 8 depicts an example method 800 for determining search data that is usable for searching an ontology. In particular, the method 800 searches an ontology based on aspects described in connection with FIGS. 1-5. Method 800 may be implemented by one or more suitable computing devices, as described herein. For example, method 800 may be implemented by a computing device (e.g., dataset tag processing server 207; and/or any one of computing devices 1101, 1105, 1107, and 1109 of FIG. 11), and/or combination of computing devices (e.g., a combination of dataset tag processing server 207 and any other device of the enterprise computing environment 200; and/or a combination of computing devices 1101, 1105, 1107, and 1109 of FIG. 11). Method 800 may be implemented in suitable computer-executable instructions, such as in dataset processing software 1127. Method 800 may also include access of an ontology and/or a lexicon database, such as ontology 613 and lexicon database 611 of FIG. 6. The ontology and lexicon database may be stored as lexicon and ontology data 1129 of FIG. 11 or as part of some other database.

At step 805, the one or more computing devices may determine a mapped tag by processing the tag based on one or more alphanumeric abbreviation mappings. This determination may be performed the same as, or similar to, the determination described at step 310 of FIG. 3.

At step 810, the one or more computing devices may determine a plurality of tokenized elements by processing the mapped tag based on one or more alphanumeric characteristics. This determination may be performed the same as, or similar to, the determination described at step 315 of FIG. 3.

At step 815, the one or more computing devices may determine a plurality of expanded tokenized elements by processing the plurality of tokenized elements based on one or more abbreviation mappings. This determination may be performed the same as, or similar to, the determination described at step 320 of FIG. 3.

At step 820, the one or more computing devices may determine a plurality of potential ontology tags by processing the plurality of expanded tokenized tags based on a plurality of tag extraction windows. This determination may be performed the same as, or similar to, the determination described at step 325 of FIG. 3.

At step 825, the one or more computing devices may include the plurality of potential ontology tags as part of the search data. In this way, the search data may include, based on the tag, characters, words, or phrases that are usable to search an ontology that includes category data (e.g., ontology 613 of FIG. 6) and/or to search additional category information (e.g., additional category information 615 of FIG. 6).

The above steps 805-825 are directed to a tag. Similar steps could be repeated for the description (e.g., beginning with determining a mapped description, continuing with determining a plurality of potential ontology descriptions, and including the plurality of potential ontology descriptions in the search data). In this way, the search data may include, based on the description, characters, words, or phrases that are usable to search an ontology that includes category data (e.g., ontology 613 of FIG. 6) and/or to search additional category information (e.g., additional category information 615 of FIG. 6).

FIG. 9 depicts an example method 900 for determining search data that is usable for searching an ontology. In particular, the method 900 searches an ontology based on search data that includes one or more regular expressions. A regular expression may include a sequence of characters that indicate a search pattern. Method 900 may be implemented by one or more suitable computing devices, as described herein. For example, method 900 may be implemented by a computing device (e.g., dataset tag processing server 207; and/or any one of computing devices 1101, 1105, 1107, and 1109 of FIG. 11), and/or combination of computing devices (e.g., a combination of dataset tag processing server 207 and any other device of the enterprise computing environment 200; and/or a combination of computing devices 1101, 1105, 1107, and 1109 of FIG. 11). Method 900 may be implemented in suitable computer-executable instructions, such as in dataset processing software 1127. Method 900 may also include access of an ontology and/or a lexicon database, such as ontology 613 and lexicon database 611 of FIG. 6. The ontology and lexicon database may be stored as lexicon and ontology data 1129 of FIG. 11 or as part of some other database.

At step 905, the one or more computing devices may determine a mapped tag by processing the tag based on one or more alphanumeric mappings. This determination may be performed the same as, or similar to, the determination described at step 310 of FIG. 3.

At step 910, the one or more computing devices may determine a lemmatized mapped tag by processing the mapped tag based on a lemmatization process. The lemmatization process may cause one or more additional words to be included as part of the lemmatized mapped tag. For example, based on the lemmatization process, a word of the mapped tag may be identified (e.g., the word "addressing" may be identified from the mapped tag). After identifying the word, a lexeme or lemma for the word may be identified (e.g., the word "address" may be the lexeme or lemma for the word "addressing"). After identifying the lexeme or lemma for the word, one or more additional words based on the lexeme or lemma may be identified (e.g., the words "address" and "addresses" may be identified based on the lexeme or lemma of "address"). After identifying the one or more additional words, the one or more additional words may be included as part of the lemmatized mapped tag (e.g., the lemmatized mapped tag may include the words "address" and "addresses" as well as the word "addressing"). This example lemmatization process may be performed for each word of the mapped tag.

At step 915, the one or more computing devices may determine, based on the lemmatized mapped tag, a first regular expression. The first regular expression may include a sequence of characters that indicate a search pattern based on the tag. For example, if the lemmatized mapped tag includes the words "address", "addresses", and "addressing", the first regular expression may include "address.*" where the "." character indicates a wildcard character and the "*" character indicates zero or more occurrences of the preceding element, which is the "." character. In this way, searching based on the first regular expression may identify occurrences of address, addresses, and addressing, among other words that satisfy the first regular expression.

At step 920, the one or more computing devices may include the first regular expression as part of the search data. In this way, the search data may include, based on the tag, a regular expression that is usable to search an ontology that includes category data (e.g., ontology 613 of FIG. 6) and/or to search additional category information (e.g., additional category information 615 of FIG. 6).

At step 925, the one or more computing devices may determine a mapped description by processing the description based on the one or more alphanumeric abbreviation mappings. This determination may be performed the same as, or similar to, the determination described at step 310 of FIG. 3, except the description is being processed instead of a tag.

At step 930, the one or more computing devices may determine a lemmatized mapped description by processing the mapped description based on the lemmatization process. This determination may be performed the same as, or similar to, the determination described at step 910 of FIG. 9, except the mapped description is being processed instead of a mapped tag.

At step 935, the one or more computing devices may determine a modified description by removing, from the lemmatized mapped description, any occurrences of the tag. For example, if the tag is the word "addressing" and if the lemmatized mapped description includes the words "addr", "address", "addressing", and "addresses", the word "addressing" may be removed such that it is not included by the modified description. Continuing this example, the modified description, based on the removal of the word "addressing", may include the words "addr", "address", and "addresses".

At step 940, the one or more computing devices may determine, based on the modified description, a second regular expression. The second regular expression may include a sequence of characters that indicate a search pattern based on the description. For example, if the modified description includes the words "addr", "address", and "addresses", the second regular expression may include "addr.*" where the "." character indicates a wildcard character and the "*" character indicates zero or more occurrences of the preceding element, which is the "." character. In this way, searching based on the second regular expression may identify occurrences of addr, address, addresses, and addressing, among other words that satisfy the second regular expression.

At step 945, the one or more computing devices may include the second regular expression as part of the search data. In this way, the search data may include, based on the description, a regular expression that is usable to search an ontology that includes category data (e.g., ontology 613 of FIG. 6) and/or to search additional category information (e.g., additional category information 615 of FIG. 6).

FIG. 10 depicts an example method 1000 for determining a data type category and/or a confidentiality category based on ontology-based and model-based confidence values. Method 1000 may be implemented by one or more suitable computing devices, as described herein. For example, method 1000 may be implemented by a computing device (e.g., dataset tag processing server 207; and/or any one of computing devices 1101, 1105, 1107, and 1109 of FIG. 11), and/or combination of computing devices (e.g., a combination of dataset tag processing server 207 and any other device of the enterprise computing environment 200; and/or a combination of computing devices 1101, 1105, 1107, and 1109 of FIG. 11). Method 1000 may be implemented in suitable computer-executable instructions, such as in dataset processing software 1127.

At step 1005, the one or more computing devices may determine, for the ontology-based data type category and/or the ontology-based confidentiality category, one or more ontology-based confidence values. This determination may be performed during, or based on, the search of an ontology (e.g., ontology 613 of FIG. 6) and/or an additional search of additional category information (e.g., additional category information 615 of FIG. 6). For example, the one or more ontology-based confidence values may be determined during the search and included as part of the historical record, which was discussed in connection with step 720 of FIG. 7. The one or more ontology-based confidence values may include an ontology-based data type confidence value and an ontology-based confidentiality confidence value.

At step 1010, the one or more computing devices may determine, for the model-based data type category and/or the ontology-based confidentiality category, one or more model-based confidence values. This determination may be performed based on use of a model. For example, each of the one or more model-based confidence values may have been determined by the model and provided, as output from the model, along with the model-based data type category and/or the model-based confidentiality category. The one or more model-based confidence values being provided as output from the model was discussed in connection with step 730 of FIG. 7. The one or more model-based confidence values may include a model-based data type confidence value and a model-based confidentiality confidence value.

At step 1015, the one or more computing devices may determine, based on the one or more ontology-based confidence values and/or the one or more model-based confidence values, the data type category and/or the confidentiality category. This determination may be performed similar to the determination that was discussed in connection with step 735 of FIG. 7. For example, one or more rules may be applied and may cause the one or more ontology-based confidence values and/or the one or more model-based confidence values to be analyzed. Based on the analysis of the one or more ontology-based confidence values and/or the one or more model-based confidence values, the one or more computing devices may determine the data type category and/or the confidentiality category. The analysis of the one or more ontology-based confidence values and/or the one or more model-based confidence values may cause either an ontology-based data type category or a model-based data type category to be selected as the data type category. The analysis of the one or more ontology-based confidence values and/or the one or more model-based confidence values may cause either an ontology-based confidentiality category or a model-based confidentiality category to be selected as the confidentiality category.

Table III illustrates examples where the one or more ontology-based confidence values and/or the one or more model-based confidence values are analyzed and used to determine the confidentiality category. In particular, each row of Table III illustrates an example where an ontology-based confidentiality category, an ontology-based confidentiality confidence value, a model-based confidentiality category, and a model-based confidentiality confidence value are analyzed and cause either the ontology-based confidentiality category or the model-based confidentiality category as the confidentiality category. Some of the examples do not analyze the ontology-based confidentiality confidence value and/or the model-based confidentiality confidence value. Those examples list the confidence values as not applicable. Based on the examples illustrated by Table III, the data type category could be determined based on a similar analysis of an ontology-based data type category, an ontology-based data type confidence value, a model-based data type category, and a model-based data type confidence value. Further, based on the examples illustrated by Table III, additional examples of the one or more rules that are applied to determine the data type category and/or the confidentiality category may be apparent.

TABLE III

Examples of analyzing the one or more ontology-based confidence values and/or the one or more model-based confidence values to determine a confidentiality category

| Example Ontology-Based Confidentiality Category | Example Ontology-Based Confidentiality Confidence Value | Example Model-Based Confidentiality Category | Example Model-Based Confidentiality Confidence Value | Example Confidentiality Category |
|---|---|---|---|---|
| Indicates the inclusion of confidential data | Indicates high confidence | Indicates the inclusion of confidential data | Indicates high confidence | Select both the ontology-based confidentiality category and the model-based confidentiality category. |
| Indicates the inclusion of confidential data | Indicates high confidence | Indicates the inclusion of confidential data | Indicates low confidence | Select, based on which has the greater confidence value, either the ontology-based confidentiality category or the model-based confidentiality category. |
| Indicates the inclusion of confidential data | Indicates low confidence | Indicates the inclusion of confidential data | Indicates high confidence | Select, based on which has the greater confidence value, either the ontology-based confidentiality category or the model-based confidentiality category. |
| Indicates the inclusion of confidential data | Indicates low confidence | Indicates the inclusion of confidential data | Indicates low confidence | Compare the confidence values to one or more thresholds If the ontology-based confidentiality confidence value satisfies the one or more |

TABLE III-continued

Examples of analyzing the one or more ontology-based confidence values and/or the one or more model-based confidence values to determine a confidentiality category

| Example Ontology-Based Confidentiality Category | Example Ontology-Based Confidentiality Confidence Value | Example Model-Based Confidentiality Category | Example Model-Based Confidentiality Confidence Value | Example Confidentiality Category |
|---|---|---|---|---|
| | | | | thresholds, select the ontology-based confidentiality category. If the model-based confidentiality confidence value satisfies the one or more thresholds, select the model-based confidentiality category. If neither of the confidence values satisfies the one or more thresholds, select neither confidentiality category. |
| Indicates the inclusion of confidential data | Not applicable | Does not indicate the inclusion of confidential data | Not applicable | Select the model-based confidentiality category |
| Does not indicate the inclusion of confidential data | Not applicable | Indicates the inclusion of confidential data | Not applicable | Select the model-based confidentiality category |
| Does not indicate the inclusion of confidential data | Not applicable | Does not indicate the inclusion of confidential data | Not applicable | Select the ontology-based confidentiality category or the model-based confidentiality category. |

Figure 11:
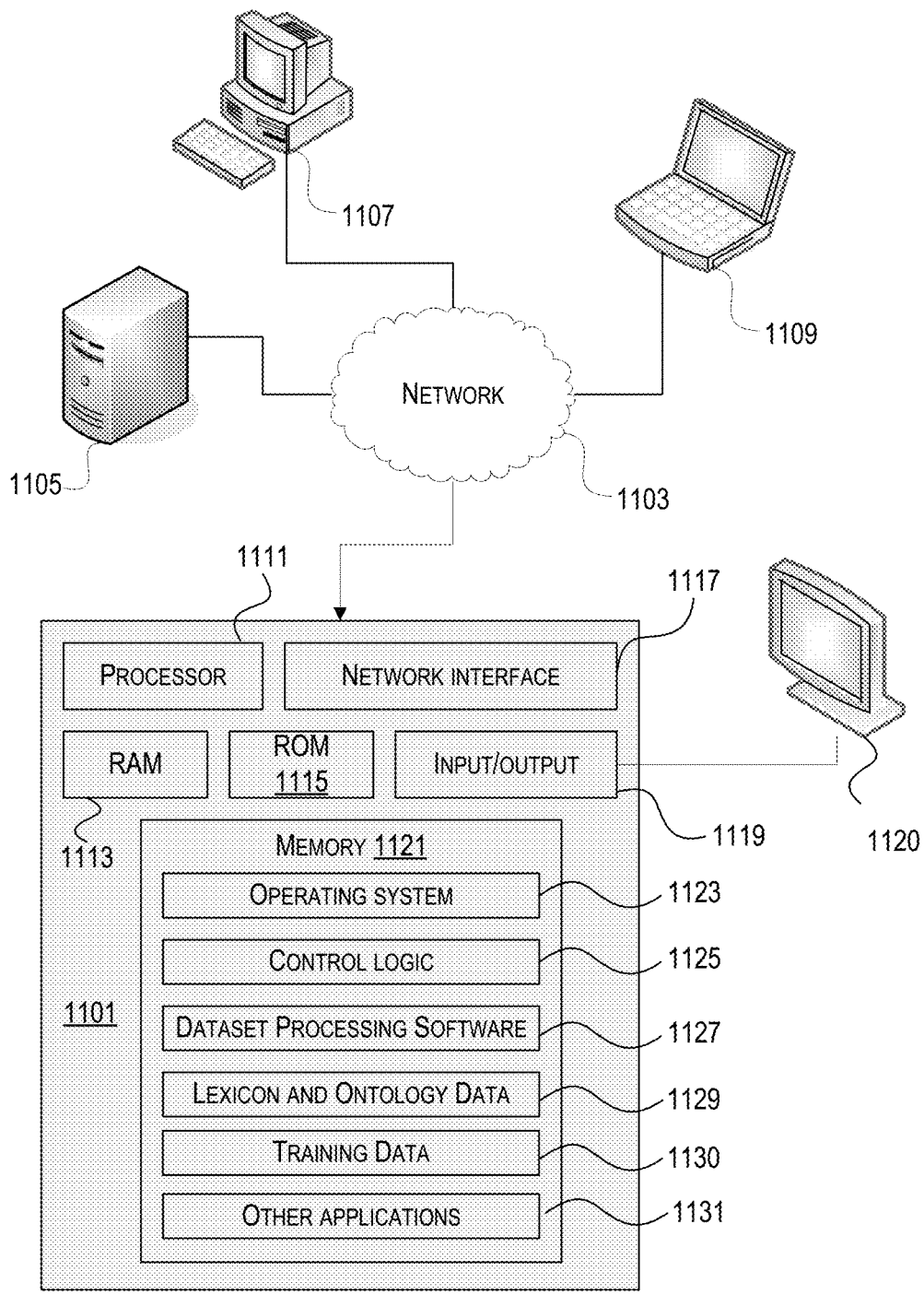
FIG. 11 depicts an example of a computing device that may be used in implementing one or more aspects described herein.

FIG. 11 illustrates one example of a computing device 1101 that may be used to implement one or more illustrative aspects discussed herein. For example, computing device 1101 may, in some embodiments, implement one or more aspects of the disclosure by reading and/or executing instructions and performing one or more actions based on the instructions. Computing device 1101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 1101 may, in some embodiments, operate in a standalone environment. In others, computing device 1101 may operate in a networked environment. As shown in FIG. 11, various network nodes 1101, 1105, 1107, and 1109 may be interconnected via a network 1103, such as the Internet. Other networks may also or alternatively be used, including private intranets, corporate networks, LANs, wireless networks, personal networks (PAN), and the like. Network 1103 is for illustration purposes and may be replaced with fewer or additional computer networks. A local area network (LAN) may have one or more of any known LAN topology and may use one or more of a variety of different protocols, such as Ethernet. Devices 1101, 1105, 1107, 1109 and other devices (not shown) may be connected to one or more of the networks via twisted pair wires, coaxial cable, fiber optics, radio waves or other communication media.

As seen in FIG. 11, computing device 1101 may include a processor 1111, RAM 1113, ROM 1115, network interface 1117, input/output interfaces 1119 (e.g., keyboard, mouse, display, printer, etc.), and memory 1121. Processor 1111 may include one or more computer processing units (CPUs), graphical processing units (GPUs), and/or other processing units such as a processor adapted to perform computations associated with speech processing or other forms of machine-learning. I/O 1119 may include a variety of interface units and drives for reading, writing, displaying, and/or printing data or files. I/O 1119 may be coupled with a display such as display 1120. Memory 1121 may store software for configuring computing device 1101 into a special purpose computing device in order to perform one or more of the various functions discussed herein. Memory 1121 may store operating system software 1123 for controlling overall operation of computing device 1101, control logic 1125 for instructing computing device 1101 to perform aspects discussed herein, dataset processing software 1127, lexicon and ontology data 1129, training data 1130, and other applications 631. Control logic 1125 may be incorporated in and may be a part of dataset processing software 1127. In other embodiments, computing device 1101 may include two or more of any and/or all of these components (e.g., two or more processors, two or more memories, etc.) and/or other components and/or subsystems not illustrated here.

Devices 1105, 1107, 1109 may have similar or different architecture as described with respect to computing device 1101. Those of skill in the art will appreciate that the functionality of computing device 1101 (or device 1105, 1107, 1109) as described herein may be spread across multiple data processing devices, for example, to distribute processing load across multiple computers, to segregate transactions based on geographic location, user access level, quality of service (QoS), etc. For example, devices 1101, 1105, 1107, 1109, and others may operate in concert to provide parallel computing features in support of the operation of control logic 1125 and/or speech processing software 1127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A method comprising:
   determining, by one or more computing devices and for a dataset, a tag associated with the dataset and a description associated with the dataset;
   determining, by the one or more computing devices, an ontology-based data type category and an ontology-based confidentiality category by searching, using search data based on the tag and the description, an ontology that includes first associations between words and a plurality of data type categories and second associations between the plurality of data type categories and one or more confidentiality categories;
   determining, by the one or more computing devices, a model-based data type category and a model-based confidentiality category by using, based on the tag and the description, a model configured to output, based on tags and descriptions, data type categories and confidentiality categories;
   determining, by the one or more computing devices and based on the ontology-based data type category and the model-based data type category, a data type category associated with the dataset;
   determining, by the one or more computing devices and based on the ontology-based confidentiality category and the model-based confidentiality category, a confidentiality category associated with the dataset; and
   modifying, by the one or more computing devices, the dataset to indicate the data type category and the confidentiality category.

2. The method of claim 1, further comprising:
   determining the search data based on:
      determining a mapped tag by processing the tag based on one or more alphanumeric abbreviation mappings, wherein the one or more alphanumeric abbreviation mappings are for abbreviations that include alphabetic and numeric characters,
      determining a plurality of tokenized elements by processing the mapped tag based on one or more alphanumeric characteristics, wherein the one or more alphanumeric characteristics are for splitting tag elements,
      determining a plurality of expanded tokenized elements by processing the plurality of tokenized elements based on one or more abbreviation mappings, wherein the one or more abbreviation mappings are for abbreviations that include alphabetic or numeric abbreviations,
      determining a plurality of potential ontology tags by processing the plurality of expanded tokenized elements based on a plurality of tag extraction windows, wherein each of the plurality of tag extraction windows has a window size that is different from each other tag extraction window of the plurality of tag extraction windows, and
      including the plurality of potential ontology tags as part of the search data.

3. The method of claim 1, further comprising:
   determining the search data based on:
      determining a mapped tag by processing the tag based on one or more alphanumeric abbreviation mappings, wherein the one or more alphanumeric abbreviation mappings are for abbreviations that include alphabetic and numeric characters,
      determining a lemmatized mapped tag by processing the mapped tag based on a lemmatization process,
      determining, based on the lemmatized mapped tag, a first regular expression,
      including the first regular expression as part of the search data,
      determining a mapped description by processing the description based on the one or more alphanumeric abbreviation mappings,
      determining a lemmatized mapped description by processing the mapped description based on the lemmatization process, determining a modified description by removing, from the lemmatized mapped description, an occurrence of the tag, determining, based on the modified description, a second regular expression, and including the second regular expression as part of the search data.

4. The method of claim 1, wherein the confidentiality category indicates that the dataset includes data that is to be protected from disclosure or excluded from disclosure.

5. The method of claim 1, further comprising:

training a plurality of models, wherein the plurality of models is associated with a plurality of tags, wherein the model is one of the plurality of models, and wherein the model is configured to output data type categories for a particular tag of the plurality of tags; and wherein using the model is performed based on determining, based on the tag and the particular tag, to use the model.

6. The method of claim 1, wherein the model is configured to output confidence values in association with the data type categories, and wherein the method further comprises:

determining, based on whether the ontology-based data type category is associated within the ontology to a word that is identified based on the search data, an ontology-based confidence value;

determining, based on using the model, a model-based confidence value for the model-based data type category; and wherein determining the data type category is performed based on the ontology-based confidence value and the model-based confidence value.

7. The method of claim 1, wherein, during the searching of the ontology, the ontology-based data type category is identified based on one or more of the first associations that are between one or more first words and the ontology-based data type category;

wherein the method further comprises determining a count that indicates how many times the one or more first words were identified during the searching of the ontology; and wherein determining the ontology-based data type category is performed based on the count.

8. The method of claim 1, wherein determining the ontology-based data type category is performed based on additional category association information that is different from the associations of the ontology.

9. The method of claim 1, further comprising:

determining, based on the data type category, whether a pre-existing data type category associated with the dataset is validated; and sending an indication of whether the pre-existing data type category is validated.

10. The method of claim 1, further comprising:

generating, based on the searching, a historical record that indicates counts for one or more words identified by the searching, one or more data type categories identified by the searching, and one or more confidentiality categories identified by the searching; and receiving, from the model, a first confidence value for the model-based data type category and a second confidence value for the model-based confidentiality category;

wherein determining the data type category is based on the historical record and the first confidence value; and wherein determining the confidentiality category is based on the historical record and the second confidence value.

11. A method comprising:

determining, by one or more computing devices and for a dataset, a tag associated with the dataset and a description associated with the dataset;

determining, by the one or more computing devices, an ontology-based data type category and an ontology-based confidentiality category, by searching, using search data based on the tag and the description, an ontology that includes first associations between words and a plurality of data type categories and second associations between the plurality of data type categories and a plurality of confidentiality categories, wherein the plurality of confidentiality categories indicate whether data is subject to a data confidentiality procedure;

determining, by the one or more computing devices, a model-based data type category and a model-based confidentiality category by using, based on the tag and the description, a model configured to output, based on tags and descriptions, data type categories and confidentiality categories;

determining, by the one or more computing devices and based on the ontology-based data type category and the model-based data type category, a data type category associated with the dataset;

determining, by the one or more computing devices and based on the ontology-based confidentiality category and the model-based confidentiality category, a confidentiality category associated with the dataset; and modifying, by the one or more computing devices, the dataset to indicate the data type category and the confidentiality category.

12. The method of claim 11, further comprising:

determining the search data based on:

determining a mapped tag by processing the tag based on one or more alphanumeric abbreviation mappings, wherein the one or more alphanumeric abbreviation mappings are for abbreviations that include alphabetic and numeric characters, determining a plurality of tokenized elements by processing the mapped tag based on one or more alphanumeric characteristics, wherein the one or more alphanumeric characteristics are for splitting tag elements, determining a plurality of expanded tokenized elements by processing the plurality of tokenized elements based on one or more abbreviation mappings, wherein the one or more abbreviation mappings are for abbreviations that include alphabetic or numeric abbreviations, determining a plurality of potential ontology tags by processing the plurality of expanded tokenized elements based on a plurality of tag extraction windows, wherein each of the plurality of tag extraction windows has a window size that is different from each other tag extraction window of the plurality of tag extraction windows, and including the plurality of potential ontology tags as part of the search data.

13. The method of claim 11, further comprising:

determining the search data based on:

determining a mapped tag by processing the tag based on one or more alphanumeric abbreviation mappings, wherein the one or more alphanumeric abbreviation mappings are for abbreviations that include alphabetic and numeric characters,
determining a lemmatized mapped tag by processing the mapped tag based on a lemmatization process,
determining, based on the lemmatized mapping tag, a first regular expression,
including the first regular expression as part of the search data,
determining a mapped description by processing the description based on the one or more alphanumeric abbreviation mappings,
determining a lemmatized mapped description by processing the mapped description based on the lemmatization process,
determining a modified description by removing, from the lemmatized mapped description, an occurrence of the tag,
determining, based on the modified description, a second regular expression, and
including the second regular expression as part of the search data.

14. The method of claim 11, further comprising:
training a plurality of models, wherein the plurality of models is associated with a plurality of tags, wherein the model is one of the plurality of models, and wherein the model is configured to output the confidentiality categories for a particular tag of the plurality of tags; and
wherein using the model is performed based on determining, based on the tag and the particular tag, to use the model.

15. The method of claim 11, wherein the model is configured to output confidence values in association with the confidentiality categories, and wherein the method further comprises:
determining, based on whether the ontology-based confidentiality category is associated within the ontology to a word that is identified based on the search data, an ontology-based confidence value;
determining, based on using the model, a model-based confidence value for the model-based confidentiality category; and
wherein determining the confidentiality category is performed based on the ontology-based confidence value and the model-based confidence value.

16. The method of claim 11, wherein, during the searching of the ontology, the ontology-based confidentiality category is identified based on one or more of the second associations that are with the ontology-based confidentiality category;
wherein the method further comprises determining a count that indicates how many times the ontology-based confidentiality category was identified during the searching of the ontology; and
wherein determining the ontology-based confidentiality category is performed based on the count.

17. The method of claim 11, further comprising:
determining, based on the confidentiality category, whether a pre-existing confidentiality category associated with the dataset is validated; and
sending an indication of whether the pre-existing confidentiality category is validated.

18. An apparatus comprising:
one or more processors; and
memory storing executable instructions that, when executed by the one or more processors, cause the apparatus to:
determine, for a dataset, a tag associated with the dataset and a description associated with the dataset, wherein the dataset is associated with a pre-existing data type category and a pre-existing confidentiality category;
determine an ontology-based data type category and an ontology-based confidentiality category by searching, using search data based on the tag and the description, an ontology that includes first associations between words and a plurality of data type categories and second associations between the plurality of data type categories and one or more confidentiality categories;
determine a model-based data type category and a model-based confidentiality category by using, based on the tag and the description, a model configured to output, based on tags and descriptions, data type categories and confidentiality categories;
determine, based on the ontology-based data type category and the model-based data type category, a data type category associated with the dataset;
determine, based on the ontology-based confidentiality category and the model-based confidentiality category, a confidentiality category associated with the dataset;
determine, based on the data type category, whether the pre-existing data type category is validated;
determine, based on the confidentiality category, whether the pre-existing confidentiality category is validated; and
send one or more indications of whether the pre-existing data type category and the pre-existing confidentiality category are validated.

19. The apparatus of claim 18, wherein the executable instructions that, when executed, cause the apparatus to determine the search data based on:
determining a mapped tag by processing the tag based on one or more alphanumeric abbreviation mappings, wherein the one or more alphanumeric abbreviation mappings are for abbreviations that include alphabetic and numeric characters,
determining a plurality of tokenized elements by processing the mapped tag based on one or more alphanumeric characteristics, wherein the one or more alphanumeric characteristics are for splitting tag elements,
determining a plurality of expanded tokenized elements by processing the plurality of tokenized elements based on one or more abbreviation mappings, wherein the one or more abbreviation mappings are for abbreviations that include alphabetic or numeric abbreviations,
determining a plurality of potential ontology tags by processing the plurality of expanded tokenized elements based on a plurality of tag extraction windows, wherein each of the plurality of tag extraction windows has a window size that is different from each other tag extraction window of the plurality of tag extraction windows, and
including the plurality of potential ontology tags as part of the search data.

20. The apparatus of claim 18, wherein the executable instructions that, when executed, cause the apparatus to determine the search data based on:
determining a mapped tag by processing the tag based on one or more alphanumeric abbreviation mappings, wherein the one or more alphanumeric abbreviation mappings are for abbreviations that include alphabetic and numeric characters,
determining a lemmatized mapped tag by processing the mapped tag based on a lemmatization process, determining, based on the lemmatized mapping tag, a first regular expression, including the first regular expression as part of the search data, determining a mapped description by processing the description based on the one or more alphanumeric abbreviation mappings, determining a lemmatized mapped description by processing the mapped description based on the lemmatization process, determining a modified description by removing, from the lemmatized mapped description, an occurrence of the tag, determining, based on the modified description, a second regular expression, and including the second regular expression as part of the search data.

* * * * *